(12) United States Patent
Yamakaji et al.

(10) Patent No.: US 11,108,038 B2
(45) Date of Patent: Aug. 31, 2021

(54) POSITIVE ELECTRODE FOR SECONDARY BATTERY, SECONDARY BATTERY, AND METHOD FOR FABRICATING POSITIVE ELECTRODE FOR SECONDARY BATTERY

(71) Applicant: SEMICONDUCTOR ENERGY LABORATORY CO., LTD., Atsugi (JP)

(72) Inventors: Masaki Yamakaji, Kanagawa (JP); Takahiro Kawakami, Kanagawa (JP); Mako Motoyoshi, Kanagawa (JP); Rika Yatabe, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 799 days.

(21) Appl. No.: 15/193,478

(22) Filed: Jun. 27, 2016

(65) Prior Publication Data

US 2016/0308200 A1 Oct. 20, 2016

Related U.S. Application Data

(63) Continuation of application No. 13/973,524, filed on Aug. 22, 2013, now Pat. No. 9,385,366.

(30) Foreign Application Priority Data

Aug. 27, 2012 (JP) .............................. JP2012-186404

(51) Int. Cl.
*H01M 4/36* (2006.01)
*H01M 4/131* (2010.01)
(Continued)

(52) U.S. Cl.
CPC .......... *H01M 4/366* (2013.01); *H01M 4/043* (2013.01); *H01M 4/0404* (2013.01);
(Continued)

(58) Field of Classification Search
CPC .... H01M 4/131; H01M 4/625; H01M 4/1391; H01M 4/043; H01M 4/0471;
(Continued)

(56) References Cited

U.S. PATENT DOCUMENTS 5,474,861 A 12/1995 Bito et al.
7,179,561 B2 2/2007 Niu et al.
(Continued)

FOREIGN PATENT DOCUMENTS

CN 001964917 A 5/2007
CN 101094806 A 12/2007
(Continued)

OTHER PUBLICATIONS

Sirisopanaporn.C et al., "Dependence of Li2FeSiO4 Electrochemistry on Structure", J. Am. Chem. Soc. (Journal of the American Chemical Society), 2011, vol. 133, No. 5, pp. 1263-1265.
(Continued)

*Primary Examiner* — Golam Mowla
(74) *Attorney, Agent, or Firm* — Nixon Peabody LLP; Jeffrey L. Costellia

(57) ABSTRACT

A positive electrode for a secondary battery which enables both good battery characteristics and electrode strength at a predetermined level, a secondary battery, and a method for fabricating the positive electrode for a secondary battery are provided. The positive electrode for a secondary battery includes a current collector and an active material layer over the current collector. The active material layer includes an active material, graphene, and a binder. A carbon layer is on a surface of the active material. The proportion of the graphene in the active material layer is greater than or equal to 0.1 wt % and less than or equal to 1.0 wt %.

22 Claims, 11 Drawing Sheets

(51) Int. Cl.
  *H01M 4/04* (2006.01)
  *H01M 4/62* (2006.01)
  *H01M 4/1391* (2010.01)
  *H01M 4/136* (2010.01)
  *H01M 4/1397* (2010.01)
  *H01M 4/505* (2010.01)
  *H01M 4/525* (2010.01)
  *H01M 4/587* (2010.01)
  *H01M 4/58* (2010.01)
  *H01M 10/0525* (2010.01)
  *H01M 10/052* (2010.01)
  *H01M 4/02* (2006.01)

(52) U.S. Cl.
  CPC ......... *H01M 4/0471* (2013.01); *H01M 4/131* (2013.01); *H01M 4/136* (2013.01); *H01M 4/1391* (2013.01); *H01M 4/1397* (2013.01); *H01M 4/505* (2013.01); *H01M 4/525* (2013.01); *H01M 4/587* (2013.01); *H01M 4/5825* (2013.01); *H01M 4/625* (2013.01); *H01M 10/0525* (2013.01); *H01M 10/052* (2013.01); *H01M 2004/028* (2013.01); *Y02E 60/10* (2013.01); *Y02P 70/50* (2015.11); *Y02T 10/70* (2013.01)

(58) Field of Classification Search
  CPC .... H01M 4/136; H01M 4/1397; H01M 4/366; H01M 4/505; H01M 4/525; H01M 4/587; H01M 4/5825; H01M 4/0404
  See application file for complete search history.

(56) References Cited

U.S. PATENT DOCUMENTS

| | | |
|---|---|---|
| 7,572,542 B2 | 8/2009 | Naoi |
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,404,305 B2 | 3/2013 | Patoux et al. |
| 8,426,067 B2 | 4/2013 | Tsukada et al. |
| 8,524,396 B2 | 9/2013 | Sano |
| 8,641,921 B2 | 2/2014 | Gibot et al. |
| 8,784,694 B2 | 7/2014 | Kay |
| 8,895,190 B2 | 11/2014 | Chang et al. |
| 9,045,346 B2 | 6/2015 | Nesper et al. |
| 9,216,907 B2 | 12/2015 | Nakano et al. |
| 9,242,864 B2 | 1/2016 | Nuspl et al. |
| 9,413,006 B2 | 8/2016 | Kay |
| 10,243,214 B2 | 3/2019 | Todoriki et al. |
| 2002/0102459 A1 | 8/2002 | Hosoya et al. |
| 2005/0260497 A1 | 11/2005 | Kumashiro et al. |
| 2007/0009799 A1 | 1/2007 | Zheng |
| 2007/0117013 A1 | 5/2007 | Hosoya et al. |
| 2007/0131915 A1 | 6/2007 | Stankovich et al. |
| 2008/0048153 A1 | 2/2008 | Naoi |
| 2008/0254296 A1 | 10/2008 | Handa et al. |
| 2009/0028772 A1 | 1/2009 | Nakaoka et al. |
| 2009/0039307 A1 | 2/2009 | Nakaoka et al. |
| 2009/0110627 A1 | 4/2009 | Choi et al. |
| 2009/0117467 A1 | 5/2009 | Zhamu et al. |
| 2009/0123850 A1 | 5/2009 | Takeuchi et al. |
| 2009/0253045 A1 | 10/2009 | Kotato et al. |
| 2009/0280411 A1 | 11/2009 | Ohira et al. |
| 2009/0305135 A1 | 12/2009 | Shi et al. |
| 2010/0028777 A1 | 2/2010 | Ueda et al. |
| 2010/0081057 A1 | 4/2010 | Liu et al. |
| 2010/0105834 A1 | 4/2010 | Tour et al. |
| 2010/0133467 A1 | 6/2010 | Ikegawa |
| 2010/0143798 A1 | 6/2010 | Zhamu et al. |
| 2010/0176337 A1 | 7/2010 | Zhamu et al. |
| 2010/0233538 A1 | 9/2010 | Nesper et al. |
| 2010/0233546 A1 | 9/2010 | Nesper et al. |
| 2010/0248034 A1 | 9/2010 | Oki et al. |
| 2010/0291438 A1 | 11/2010 | Ahn et al. |
| 2010/0301279 A1* | 12/2010 | Nesper ............... B82Y 30/00 252/502 |
| 2010/0304217 A1 | 12/2010 | Suzuki et al. |
| 2010/0308277 A1 | 12/2010 | Grupp |
| 2010/0310908 A1 | 12/2010 | Zhang et al. |
| 2010/0330421 A1 | 12/2010 | Cui et al. |
| 2011/0008233 A1 | 1/2011 | Miyanaga et al. |
| 2011/0012067 A1 | 1/2011 | Kay |
| 2011/0091772 A1 | 4/2011 | Mishima et al. |
| 2011/0111299 A1 | 5/2011 | Liu et al. |
| 2011/0111303 A1 | 5/2011 | Kung et al. |
| 2011/0118123 A1 | 5/2011 | Lee et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2012/0003540 A1 | 1/2012 | Nakano et al. |
| 2012/0045688 A1 | 2/2012 | Liu et al. |
| 2012/0045692 A1 | 2/2012 | Takemura et al. |
| 2012/0058397 A1* | 3/2012 | Zhamu ............... H01M 4/13 429/231.8 |
| 2012/0063988 A1 | 3/2012 | Tour et al. |
| 2012/0088151 A1 | 4/2012 | Yamazaki et al. |
| 2012/0088156 A1 | 4/2012 | Nomoto et al. |
| 2012/0100402 A1 | 4/2012 | Nesper et al. |
| 2012/0129736 A1 | 5/2012 | Tour et al. |
| 2012/0142111 A1 | 6/2012 | Tour et al. |
| 2012/0183839 A1 | 7/2012 | Yuasa et al. |
| 2012/0197051 A1 | 8/2012 | Tour et al. |
| 2012/0214068 A1 | 8/2012 | Dai et al. |
| 2012/0244430 A1 | 9/2012 | Yamazaki et al. |
| 2012/0308891 A1 | 12/2012 | Todoriki et al. |
| 2013/0047423 A1 | 2/2013 | Miwa et al. |
| 2013/0130113 A1 | 5/2013 | Takano et al. |
| 2013/0156942 A1 | 6/2013 | Yamakaji et al. |
| 2013/0266859 A1 | 10/2013 | Todoriki et al. |
| 2014/0113188 A1 | 4/2014 | Gibot et al. |
| 2014/0166946 A1 | 6/2014 | Miwa et al. |
| 2014/0298646 A1 | 10/2014 | Ikegawa |
| 2015/0263331 A1 | 9/2015 | Miyanaga et al. |
| 2015/0270548 A1 | 9/2015 | Nesper et al. |
| 2016/0079600 A1 | 3/2016 | Miwa et al. |

FOREIGN PATENT DOCUMENTS

| | | |
|---|---|---|
| CN | 101258628 A | 9/2008 |
| CN | 101849302 A | 9/2010 |
| CN | 101935036 A | 1/2011 |
| CN | 102007070 A | 4/2011 |
| CN | 102299326 A | 12/2011 |
| CN | 102315423 A | 1/2012 |
| CN | 102456869 A | 5/2012 |
| EP | 1772428 A | 4/2007 |
| EP | 2228854 A | 9/2010 |
| EP | 2228855 A | 9/2010 |
| EP | 2256087 A | 12/2010 |
| EP | 2277828 A | 1/2011 |
| EP | 2325138 A | 5/2011 |
| EP | 2352189 A | 8/2011 |
| EP | 2357693 A | 8/2011 |
| EP | 2413402 A | 2/2012 |
| EP | 2445049 A | 4/2012 |
| JP | 06-060870 A | 3/1994 |
| JP | 2002-110162 A | 4/2002 |
| JP | 2005-332655 A | 12/2005 |
| JP | 2006-265751 A | 10/2006 |
| JP | 2007-042620 A | 2/2007 |
| JP | 2008-526664 | 7/2008 |
| JP | 2009-500806 | 1/2009 |
| JP | 2009-524567 | 7/2009 |
| JP | 2009-176721 A | 8/2009 |
| JP | 2010-275186 A | 12/2010 |
| JP | 2011-503804 | 1/2011 |
| JP | 2011-048992 A | 3/2011 |
| JP | 2011-517053 | 5/2011 |

(56) References Cited

FOREIGN PATENT DOCUMENTS

| | | |
|---|---|---|
| JP | 2011-105593 A | 6/2011 |
| JP | 4765077 | 9/2011 |
| JP | 2012-500179 | 1/2012 |
| JP | 2012-064571 A | 3/2012 |
| JP | 2012-094516 A | 5/2012 |
| JP | 2012-099467 A | 5/2012 |
| JP | 2012-099468 A | 5/2012 |
| JP | 2012-527396 | 11/2012 |
| JP | 2012-530044 | 11/2012 |
| KR | 2006-0077359 A | 7/2006 |
| KR | 2007-0030274 A | 3/2007 |
| KR | 2010-0088667 A | 8/2010 |
| KR | 2010-0127729 A | 12/2010 |
| KR | 2011-0054766 A | 5/2011 |
| KR | 2012-0047782 A | 5/2012 |
| WO | WO-2005/121022 | 12/2005 |
| WO | WO-2006/062947 | 6/2006 |
| WO | WO-2006/071076 | 7/2006 |
| WO | WO-2007/008422 | 1/2007 |
| WO | WO-2007/061945 | 5/2007 |
| WO | WO-2007/094644 | 8/2007 |
| WO | WO-2008/105490 | 9/2008 |
| WO | WO-2008/113570 | 9/2008 |
| WO | WO-2009/061685 | 5/2009 |
| WO | WO-2009/127901 | 10/2009 |
| WO | WO 2009/144600 | 12/2009 |
| WO | WO-2010/022164 | 2/2010 |
| WO | WO-2010/053174 | 5/2010 |
| WO | WO-2010/096665 | 8/2010 |
| WO | WO-2010/147859 | 12/2010 |
| WO | WO-2010/147860 | 12/2010 |
| WO | WO-2011/016889 | 2/2011 |
| WO | WO-2011/057074 | 5/2011 |
| WO | WO-2011/079238 | 6/2011 |
| WO | WO-2012/023464 | 2/2012 |
| WO | WO-2012/046669 | 4/2012 |
| WO | WO-2012/046791 | 4/2012 |

OTHER PUBLICATIONS

Wang.L et al., "A facile method of preparing mixed conducting LiFePO4/graphene composites for lithium-ion batteries", Solid State Ionics, Oct. 28, 2010, vol. 181, pp. 1685-1689, Elsevier.

Pan.X et al., "Synthesis of LiMnPO4 microspheres assembled by plates, wedges and prisms with different crystallographic orientations and their electrochemical performance", CrystEngComm, Sep. 17, 2012, vol. 14, pp. 6412-6418.

Zane.D et al., "Factor affecting rate performance of undoped LiFePO4", Electrochimica Acta, Oct. 1, 2004, vol. 49, No. 25, pp. 4259-4271, Elsevier.

Sun.X et al., "Surface Structure Characterization and Electrochemical Characteristics of Carbon-Coated Lithium Iron Phosphate (C-LiFeP04)Pa rticles", Mat. Res. Soc. Symp. Proc. (Materials Research Society Symposia Proceedings), 2012, vol. 1388, pp. 1-6, 2012 Materials Research Society.

Amin.R et al., "Anisotropy of Electronic and Ionic Transport in LiFePO4 Single Crystals", Electrochemical and Solid-State Letters, 2007, vol. 10, No. 1, pp. A13-A16.

Kim.D et al., "Synthesis of LifePO4 Nanoparticles in Polyol Medium and Their Electrochemical Properties", Electrochemical and Solid-State Letters, 2006, vol. 9, No. 9, pp. A439-A442.

Kimura.T et al., "The pseudo-single-crystal method: a third approach to crystal structure determination", Journal of Applied Crystallography, Feb. 12, 2009, vol. 42, pp. 535-537.

Teng.F et al., "In situ growth of LiFePO4 nanorod arrays under hydrothermal condition", Solid State Sciences, May 1, 2010, vol. 12, No. 5, pp. 952-955, Elsevier.

Upreti.S et al., "Crystal Structure, Physical Properties, and Electrochemistry of Copper Substituted LiFePO4 Single Crystals", Chem. Mater. (Chemistry of Materials), 2012, vol. 24, No. 1, pp. 166-173.

Padhi.A et al., "Phospho-olivines as Positive-Electrode Materials for Rechargeable Lithium Batteries", J. Electrochem. Soc. (Journal of the Electrochemical Society), Apr. 1, 1997, vol. 144, No. 4, pp. 1188-1194.

Zhou.X et al., "Graphene modified LiFePO4 cathode materials for high power lithium ion batteries", J. Mater. Chem. (Journal of Materials Chemistry), 2011, vol. 21, pp. 3353-3358.

Paek.S et al., "Enhanced Cyclic Performance and Lithium Storage Capacity of SnO2/Graphene Nanoporous Electrodes with Three-Dimensionally Delaminated Flexible Structure", Nano Letters, 2009, vol. 9, No. 1, pp. 72-75.

Wang.G et al., "Sn/graphene nanocomposite with 3D architecture for enhanced reversible lithium storage in lithium ion batteries", J. Mater. Chem. (Journal of Materials Chemistry), 2009, vol. 19, No. 44, pp. 8378-8384.

Wang.D et al., "Self-Assembled TiO2-Graphene Hybrid Nanostructures for Enhanced Li-Ion Insertion", ACS Nano, 2009, vol. 3, No. 4, pp. 907-914.

Su.F et al., "Flexible and planar graphene conductive additives for lithium-ion batteries", J. Mater. Chem. (Journal of Materials Chemistry), 2010, vol. 20, pp. 9644-9650.

Yu.G et al., "Solution-Processed Graphene/MnO2 Nanostructured Textiles for High-Performance Electrochemical Capacitors", Nano Letters, 2011, vol. 11, No. 7, pp. 2905-2911.

Todoriki.H et al., "High performance lithium ion battery using Graphene Net electrode", 222nd ECS Meeting Abstract, Oct. 7, 2012, p. 1014, ECS.

Park.S et al., "Hydrazine-reduction of graphite-and graphene oxide", Carbon, Mar. 15, 2011, vol. 49, No. 9, pp. 3019-3023, Elsevier.

International Search Report (Application No. JP2013/058203) dated Apr. 23, 2013.

Written Opinion (Application No. JP2013/058203) dated Apr. 23, 2013.

Chinese Office Action (Application No. 201310374107.8) dated Sep. 5, 2016.

Dreyer.D et al., "The Chemistry of Graphene Oxide", Chemical Society Reviews, Nov. 3, 2009, vol. 39, No. 1, pp. 228-240.

Sundaram.R et al., "Electrochemical Modification of Graphene", Adv. Mater. (Advanced Materials), Jul. 7. 2008, vol. 20, No. 16, pp. 3050-3053.

Mattevi.C et al., "Evolution of electrical, chemical, and structural properties of transparent and conducting chemically derived graphene thin films", Adv. Funct. Mater. (Advanced Functional Materials), Jun. 8, 2009, vol. 19, No. 16, pp. 2577-2583.

Zhang.H et al., "Vacuum-assisted synthesis of graphene from thermal exfoliation and reduction of graphite oxide", J. Mater. Chem. (Journal of Materials Chemistry), Apr. 14, 2011, vol. 21, No. 14, pp. 5392-5397.

Zhou.M et al., "Controlled Synthesis of Large-Area and Patterned Electrochemically Reduced Graphene Oxide Films", Chemistry A European Journal, May 14, 2009, vol. 15, No. 25, pp. 6116-6120.

Wang.Z et al., "Direct Electrochemical Reduction of Single-Layer Graphene Oxide and Subsequent Functionalization with Glucose Oxidase", J. Phys. Chem. C (The Journal of Physical Chemistry C), 2009, vol. 113, No. 32, pp. 14071-14075.

Shao.Y et al., "Facile and controllable electrochemical reduction of graphene oxide and its applications", J. Mater. Chem. (Journal of Materials Chemistry), 2010, vol. 20, No. 4, pp. 743-748.

\* cited by examiner

POSITIVE ELECTRODE FOR SECONDARY BATTERY, SECONDARY BATTERY, AND METHOD FOR FABRICATING POSITIVE ELECTRODE FOR SECONDARY BATTERY

BACKGROUND OF THE INVENTION

1. Field of the Invention

The present invention relates to a positive electrode for a secondary battery, a secondary battery, and a method for fabricating the positive electrode for a secondary battery.

2. Description of the Related Art

With the recent rapid spread of portable electronic devices such as cell phones, smartphones, electronic book readers (e-book readers), and portable game machines, research and development have been extensively conducted on secondary batteries that are power sources for driving the portable electronic devices, typified by lithium secondary batteries. The secondary batteries are of growing importance in a variety of uses; for example, hybrid vehicles and electric vehicles receive attention as a measure against global environmental problems and oil resources problems.

A lithium secondary battery, which is one of the secondary batteries and widely used because of its high energy density, includes a positive electrode including an active material capable of occlusion and release of lithium, such as lithium cobalt oxide ($LiCoO_2$) or lithium iron phosphate ($LiFePO_4$), a negative electrode formed of a carbon material capable of occlusion and release of lithium, such as graphite, an electrolyte solution in which an electrolyte formed of a lithium salt such as $LiBF_4$ or $LiPF_6$ is dissolved in an organic solvent such as ethylene carbonate or diethyl carbonate, and the like. A lithium secondary battery is charged and discharged in such a way that lithium ions in the secondary battery move between the positive electrode and the negative electrode through the electrolyte solution and are inserted into or extracted from the active materials of the positive electrode and the negative electrode.

A binder is mixed into an electrode in order that active materials can be bound or an active material and a current collector can be bound. Since the binder is generally an organic high molecular compound such as polyvinylidene fluoride (PVDF) which has an insulating property, the electron conductivity of the binder is extremely low. For this reason, as the ratio of the mixed binder to the active material is increased, the amount of the active material in the electrode is relatively decreased, resulting in the lower charge and discharge capacity of the secondary battery.

Hence, in Patent Document 1, mixture of a conductive additive such as acetylene black (AB) or a graphite particle increases the electron conductivity between active materials or between an active material and a current collector. Thus, a positive electrode active material with high electron conductivity can be provided.

However, because acetylene black generally used as a particulate conductive additive is a high-volume particle with an average diameter of several tens of nanometers to several hundreds of nanometers, contact between acetylene black and an active material hardly becomes surface contact and tends to be point contact. Consequently, contact resistance between the active material and the conductive additive is high. Further, if the amount of the conductive additive is increased to increase contact points between the active material and the conductive additive, the proportion of the amount of the active material in the electrode decreases, resulting in a decrease in the charge and discharge capacity of the battery.

On the other hand, Patent Document 2 discloses the use of a single layer or a stacked layer of graphene (which is referred to as two-dimensional carbon in Patent Document 2) as a conductive additive, instead of the use of a particulate conductive additive such as acetylene black. Extending two-dimensionally, the single layer or the stacked layer of graphene improves the adhesion between active materials and the adhesion between conductive additives, leading to an increase in conductivity of an electrode.

REFERENCE

[Patent Document 1] Japanese Published Patent Application No. 2002-110162

[Patent Document 2] Japanese Published Patent Application No. 2012-064571

SUMMARY OF THE INVENTION

As a method for forming such a single layer or a stacked layer of graphene used as the conductive additive, a method in which graphene oxide is used as a raw material is given. That is, graphene oxide obtained by separating a layer of graphene oxide from graphite oxide is mixed with a main material of a positive electrode active material and baked, so that the graphene oxide is reduced at the same time and a single layer or a stacked layer of graphene as a conductive additive is formed. In addition, the positive electrode active material composed of the main material of the positive electrode active material and graphene is mixed with a binder to form slurry. The slurry is applied to a current collector and dried. Thus, a positive electrode is fabricated.

The present inventors, however, found that when such a single layer or a stacked layer of graphene formed of graphene oxide as a raw material is used as a conductive additive in an electrode, the electrode strength of the electrode is not sufficient while charge and discharge characteristics thereof are good.

"Electrode strength is not sufficient" means that an active material layer easily separates from a current collector. In a mass production process, before and after baking, an electrode sheet in which slurry is applied over a current collector is bent, for example, due to being wound around a roller for transport. For this reason, an electrode sheet whose electrode strength is not sufficient is not suitable for the mass production process because separation occurs due to the bend of the electrode sheet caused at the time of transport.

Although largely contributing to an increase in the conductivity of the electrode, an increase in the amount of the single layer or the stacked layer of graphene in the active material layer reduces the adhesion between materials in the active material layer and the adhesion between the active material layer and the current collector. This indicates that the increase in the amount of the single layer or the stacked layer of graphene makes it difficult for a binder to enter a space between the single layer or the stacked layer of graphene and the active material or a space between the single layers or the stacked layers of graphene, resulting in a decrease in the adhesion of the active material layer.

On the other hand, in the case where the amount of the single layer or the stacked layer of graphene in the active material layer is decreased, the resistance of the electrode is increased to reduce the charge and discharge characteristics of the electrode.

In view of the above, the present inventors obtained the proportion of a binder in a mixture of the binder, a conductive additive, and an active material by checking electrode strengths of positive electrodes through a winding test. The positive electrodes each contained graphene oxide serving as a raw material of the conductive additive with a proportion of 2 wt % (weight percent concentration (weight ratio)), and contained polyvinylidene fluoride (PVDF) as a binder with different proportions, 5 wt %, 10 wt %, and 20 wt %.

As the active material, lithium iron phosphate ($LiFePO_4$) was used. $LiFePO_4$, graphene oxide, and PVDF were mixed at a ratio of (98−x):2:x (x is one of 5, 10, and 20, and the unit is wt %). The mixture was applied over a current collector and baked. Then, electrode strength was checked without pressing or reduction treatment on the graphene oxide because it is based on the premise that in the mass production process, the electrode sheet is transferred, for example, by being wound around the roller, which causes the electrode sheet to be bent, before the pressing or the reduction treatment.

Electrode strength was checked in such a manner that a sheet-like positive electrode was wound around a cylinder with a diameter of 6 mm and whether or not an active material layer was separated was visually checked. The results are shown in Table 1. A circle means that the active material layer was not separated from the current collector; a cross means that the active material layer was separated from the current collector.

TABLE 1

| | Proportion of PVDF | | |
|---|---|---|---|
| | 5 wt % | 10 wt % | 20 wt % |
| Winding test (φ 6 mm) | x | x | o |

These results show that the proportion of PVDF that is the binder in the mixture needs to be greater than or equal to 20 wt %.

TABLE 2

| Proportion of PVDF | Thickness (μm) | Density of electrode (g/cm$^3$) | Density of active material (g/cm$^3$) | Capacity per volume (mAh/cm$^3$) |
|---|---|---|---|---|
| 5 wt % | 38 | 1.98 | 1.84 | 268 |
| 10 wt % | 30 | 1.90 | 1.67 | 228 |
| 20 wt % | 28 | 1.71 | 1.33 | 171 |

However, as shown in Table 2, as the proportion of the binder increases, the density of the electrode, the density of the active material, and the charge and discharge capacity per volume decrease. In particular, the proportion of the active material decreases due to an increase in the proportion of the binder, so that the charge and discharge capacity per volume of the whole positive electrode decreases. Note that "the density of the electrode" refers to the total sum of the weights of the active material, graphene, and the binder per unit volume (cm$^3$) of the active material layer; "the density of the active material" refers to the weight of the active material per unit volume (cm$^3$) of the active material layer.

Thus, to increase the conductivity of an electrode, the use of graphene oxide as a raw material of a conductive additive is advantageous, but it might cause a decline in electrode strength. On the other hand, when the amount of graphene oxide is decreased, the resistance of the electrode is increased to reduce charge and discharge characteristics, and when the proportion of the binder is increased to prevent a decline in electrode strength, charge and discharge capacity is decreased.

In view of the above, an object of one embodiment of the present invention is to provide a positive electrode for a secondary battery which enables both good battery characteristics and electrode strength at a predetermined level, and the secondary battery.

Another object of one embodiment of the present invention is to provide a method for fabricating a positive electrode for a secondary battery which enables both good battery characteristics and electrode strength at a predetermined level.

In the present invention, to prevent a decline in electrode strength, the addition amount of graphene serving as a conductive additive is reduced. That is, the addition amount of graphene oxide which is a raw material of the conductive additive is reduced. On the other hand, in order to ensure the electric conductivity of an electrode to maintain battery characteristics such as charge and discharge capacity, a carbon layer is provided on a surface of an active material. Thus, a positive electrode for a secondary battery which uses graphene oxide as the raw material of the conductive additive and enables good battery characteristics and electrode strength at a predetermined level can be fabricated.

One embodiment of the present invention is a positive electrode for a secondary battery including a current collector and an active material layer over the current collector. The active material layer includes an active material, graphene, and a binder. A carbon layer is on a surface of the active material. The proportion of the graphene in the active material layer is greater than or equal to 0.1 wt % and less than or equal to 1.0 wt %.

Graphene serves as a conductive additive forming an electron conducting path between active materials and between the active material and a current collector. Graphene in this specification includes single-layer graphene and multilayer graphene including two to hundred layers. Single-layer graphene refers to a sheet of one atomic layer of carbon molecules having π bonds. In the case of forming this graphene by reducing graphene oxide, oxygen contained in the graphene oxide is not extracted entirely and remains partly in the graphene. When the graphene contains oxygen, the proportion of oxygen is greater than or equal to 2 atomic % and less than or equal to 20 atomic %, preferably greater than or equal to 3 atomic % and less than or equal to 15 atomic %. Note that graphene oxide refers to a compound formed by oxidizing such graphene.

A decrease in the conductivity of the electrode accompanied by the reduction of the addition amount of graphene oxide used as the raw material of the conductive additive is compensated with the carbon layer on the surface of the active material. Formation of the carbon layer having good conductivity on the surface of the active material can increase the conductivity of the active material and can prevent a decrease in load characteristics.

The carbon layer is amorphous, and is provided to entirely or partly cover a surface of a particulate active material. The carbon layer with an extremely small thickness does not contribute to an increase in the conductivity of the electrode, whereas the carbon layer with an extremely large thickness decreases the density of the active material. For this reason, the thickness may be set as appropriate depending on desired battery characteristics. For example, the carbon layer may have a thickness of more than or equal to 1 nm and less than or equal to 50 nm, preferably more than or equal to 5 nm and less than or equal to 10 nm.

One embodiment of the present invention is a positive electrode for a secondary battery including a current collector and an active material layer over the current collector.

The active material layer includes an active material, graphene, and a binder. A carbon layer is on a surface of the active material. The current collector and the active material layer are not separated from each other in a winding test using a cylinder with a diameter of 6 mm. The maximum value of discharge capacity (mAh/g) is more than or equal to 140 mAh/g at a lower limit voltage of 2 V and a discharging rate of 1 C, and a discharge curve has a plateau in 60% or more of a measuring range of the discharge capacity.

Here, the winding test is a test for checking whether or not the active material layer is separated from the current collector (i.e., electrode strength) in steps for stamping out the electrode into a predetermined size, stacking the electrode, reeling in the electrode, and the like. The winding test is performed in such a manner that the cylinder (cylinder body) is prepared, the electrode is wound around the cylinder, and whether or not the active material layer is separated is visually checked. The smaller the diameter of the cylinder to be used is, the more rigorous the condition of the winding test is. Although the cylinder with a diameter of 6 mm is used in this specification, it is preferable that the electrode be not separated in a test using a cylinder with a diameter much smaller than 6 mm.

A charge rate C refers to the rate at which a battery is charged and is represented by "current (A)÷capacity (Ah)". For example, the charge rate in the case of charging a battery having a capacity of 1 Ah with 1 A is 1 C. A discharge rate C refers to the rate at which a battery is discharged and is represented by "current (A)÷capacity (Ah)". For example, the discharge rate in the case of discharging a battery having a capacity of 1 Ah with 1 A is 1 C.

"The discharge curve has a plateau" means that voltage is constant or almost constant regardless of a value of discharge capacity (mAh/g). "Voltage is almost constant" means that the absolute value of the amount of change in voltage is within 5 mV while a change in the amount of discharge capacity is 10 mAh/g.

One embodiment of the present invention is a method for fabricating a positive electrode for a secondary battery including the steps of coating a surface of an active material with a carbon layer; mixing the active material coated with the carbon layer, graphene oxide, and a binder to form a mixture so that the proportion of the graphene oxide in the mixture is greater than or equal to 0.2 wt % and less than or equal to 1.0 wt %; providing the mixture over a current collector; and reducing the graphene oxide to form an active material layer containing graphene.

One embodiment of the present invention can provide a positive electrode for a secondary battery which enables both good battery characteristics and electrode strength at a predetermined level, and the secondary battery.

Further, one embodiment of the present invention can provide a method for fabricating a positive electrode for a secondary battery which enables both good battery characteristics and electrode strength at a predetermined level.

DETAILED DESCRIPTION OF THE INVENTION

Embodiments will be described below with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

Embodiment 1

In this embodiment, an example of a positive electrode for a secondary battery of one embodiment of the present invention is described with reference to FIGS. 1A to 1C.

Figure 1A:
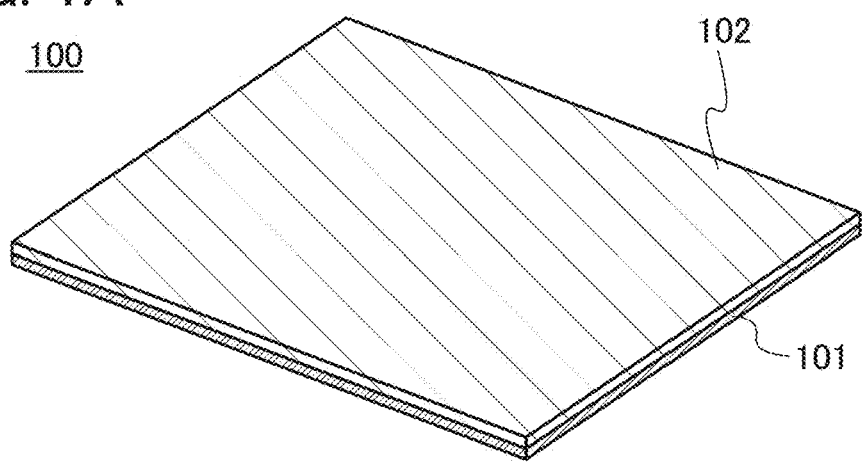
FIGS. 1A to 1C illustrate a positive electrode for a secondary battery.

FIG. 1A is a perspective view of a positive electrode. A positive electrode 100 has a structure in which an active material layer 102 is provided over a current collector 101. Note that although the active material layer 102 is provided on one surface of the current collector 101 in FIG. 1A, the active material layer 102 may be provided on both surfaces of the current collector 101.

The current collector 101 can be formed using a highly conductive material which is not alloyed with a carrier ion such as lithium ion or the like, such as a metal typified by stainless steel, gold, platinum, zinc, iron, copper, aluminum, titanium, or tantalum or an alloy thereof. Alternatively, the current collector 101 can be formed using an aluminum alloy to which an element which improves heat resistance, such as silicon, titanium, neodymium, scandium, or molybdenum, is added. Further alternatively, the current collector 101 may be formed using a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The current collector 101 can have a foil-like shape, a plate-like shape (sheet-like shape), a net-like shape, a cylindrical shape, a coil shape, a punching-metal shape, an expanded-metal shape, or the like, as appropriate. The current collector 101 preferably has a thickness of more than or equal to 10 μm and less than or equal to 30 μm.

Figure 1B:
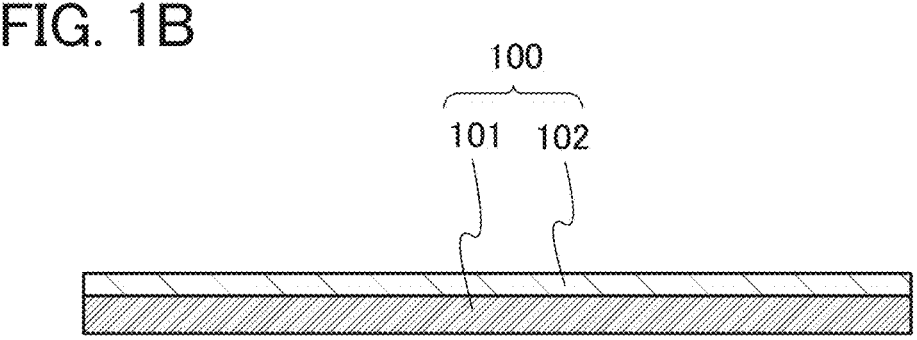

FIG. 1B is an enlarged view of part of the positive electrode 100 in FIG. 1A. FIG. 1C is a cross-sectional view of part of the positive electrode 100 in the thickness direction.

Figure 1C:
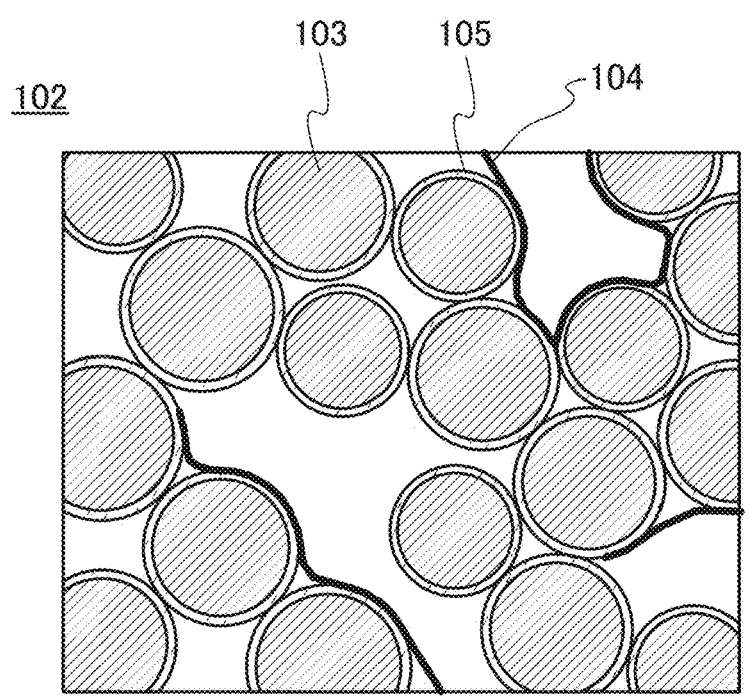

As illustrated in FIG. 1C, the active material layer 102 includes an active material 103, graphene 104, and a binder (not illustrated).

The active material 103 is at least a material capable of insertion and extraction of carrier ions such as lithium ions. For example, a compound such as $LiFeO_2$, $LiCoO_2$, $LiNiO_2$, $LiMn_2O_4$, $V_2O_5$, $Cr_2O_5$, or $MnO_2$ can be used.

Further, a lithium-containing composite phosphate with an olivine-type crystal structure ($LiMPO_4$ (general formula) (M is one or more of Fe(II), Mn(II), Co(II), and Ni(II))) can be used for the active material 103. Typical examples of the general formula LiMPO$_4$ include LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), LiFe$_f$Ni$_g$Co$_h$Mn$_i$PO$_4$ (f+g+h+i≤1, 0<f<1, 0<g<1, 0<h<1, and 0<i<1), and the like.

LiFePO$_4$ is particularly preferable because it meets requirements with balance for a positive electrode active material, such as safety, stability, high capacity density, high potential, and the existence of lithium ions that can be extracted in initial oxidation (charging).

Further, a lithium-containing composite metal oxide with a layered rock-salt crystal structure can be used. Examples of the lithium-containing composite metal oxide with a layered rock-salt crystal structure include lithium cobalt oxide (LiCoO$_2$), LiNiO$_2$, LiMnO$_2$, Li$_2$MnO$_3$, an NiCo-based lithium-containing composite metal oxide (a general formula thereof is LiNi$_x$Co$_{1-x}$O$_2$ (0<x<1)) such as LiNi$_{0.8}$Co$_{0.2}$O$_2$, an NiMn-based lithium-containing composite metal oxide (a general formula thereof is LiNi$_x$Mn$_{1-x}$O$_2$ (0<x<1)) such as LiNi$_{0.5}$Mn$_{0.5}$O$_2$, an NiMnCo-based lithium-containing composite metal oxide (also referred to as NMC, and a general formula thereof is LiNi$_x$Mn$_y$Co$_{1-x-y}$O$_2$ (x>0, y>0, and x+y<1)) such as LiNi$_{1/3}$Mn$_{1/3}$Co$_{1/3}$O$_2$, and the like. Moreover, Li(Ni$_{0.8}$Co$_{0.15}$Al$_{0.05}$)O$_2$, Li$_2$MnO$_3$-LiMO$_2$ (M=Co, Ni, or Mn), and the like can be given as the examples.

LiCoO$_2$ is particularly preferable because it has high capacity, is more stable in the air than LiNiO$_2$, and is more thermally stable than LiNiO$_2$, for example.

Further, a lithium-containing composite manganese oxide with a spinel crystal structure, such as LiMn$_2$O$_4$, Li(MnAl)$_2$O$_4$, or LiMn$_{1.5}$Ni$_{0.5}$O$_4$, can be used.

The lithium-containing composite manganese oxide with a spinel crystal structure, such as LiMn$_2$O$_4$, is preferably mixed with a small amount of lithium nickel oxide (e.g., LiNiO$_2$ or LiNi$_{1-x}$MO$_2$ (M=Co, Al, or the like)), in which case elution of manganese is suppressed, for example.

Further, a lithium-containing composite silicate such as Li$_{(2-j)}$MSiO$_4$ (general formula) (M is one or more of Fe(II), Mn(II), Co(II), and Ni(II) and 0≤j≤2) can be used. Typical examples of the general formula Li$_{(2-j)}$MSiO$_4$ include Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), Li$_{(2-j)}$Fe$_r$Ni$_s$Co$_t$Mn$_u$SiO$_4$ (r+s+t+u≤1, 0<r<1, 0<s<1, 0<t<1, and 0<u<1), and the like.

Further, as the active material 103, a nasicon compound represented by a general formula A$_x$M$_2$(XO$_4$)$_3$ (A=Li, Na, or Mg; M=Fe, Mn, Ti, V, Nb, or Al; and X=S, P, Mo, W, As, or Si) can be used. Examples of the nasicon compound include Fe$_2$(MnO$_4$)$_3$, Fe$_2$(SO$_4$)$_3$, Li$_3$Fe$_2$(PO$_4$)$_3$, and the like. Further alternatively, as the active material 103, a compound represented by a general formula Li$_2$MPO$_4$F, Li$_2$MP$_2$O$_7$, or Li$_5$MO$_4$ (M=Fe or Mn), perovskite fluoride such as NaF$_3$ or FeF$_3$, metal chalcogenide such as TiS$_2$ or MoS$_2$ (sulfide, selenide, or telluride), a lithium-containing composite vanadium oxide with an inverse spinel crystal structure such as LiMVO$_4$, a vanadium oxide based material (e.g., V$_2$O$_5$, V$_6$O$_{13}$, and LiV$_3$O$_8$), a manganese oxide based material, an organic sulfur based material, or the like can be used.

In the case where carrier ions are alkali metal ions other than lithium ions, alkaline-earth metal ions, beryllium ions, or magnesium ions, as the active material 103, any of the above-described material containing lithium may be used by substituting an alkali metal (e.g., sodium or potassium), an alkaline-earth metal (e.g., calcium, strontium, or barium), beryllium, or magnesium for the lithium.

The active material 103 can be in the form of particles made of secondary particles with average diameter or diameter distribution, which are obtained in such a way that material compounds are mixed at a predetermined ratio and baked and the resulting baked product is crushed, granulated, and classified by an appropriate means. Therefore, the active material 103 is schematically illustrated as a circle in FIG. 1C; however, the shape of the active material 103 is not limited to this shape.

The average diameter of a secondary particle of the active material 103 is less than or equal to 500 nm, preferably greater than or equal to 50 nm and less than or equal to 500 nm.

A surface of the active material 103 is entirely or partly coated with a carbon layer 105.

Being coated with the carbon layer 105, the surface of the active material 103 can have good conductivity. For this reason, the addition amount of graphene oxide used as a raw material of a conductive additive can be reduced to a small amount and the conductivity of the active material can be increased.

The carbon layer 105 is amorphous, and is provided to entirely or partly cover a surface of a particulate active material. The carbon layer 105 with an extremely small thickness does not contribute to an increase in the conductivity of the electrode, whereas the carbon layer 105 with an extremely large thickness decreases the density of the active material. For this reason, the thickness may be set as appropriate depending on desired battery characteristics. For example, the carbon layer 105 may have a thickness of more than or equal to 1 nm and less than or equal to 50 nm, preferably more than or equal to 5 nm and less than or equal to 10 nm.

The binder has a function of bonding additives in the active material layer 102 or the active material layer 102 and the current collector 101.

Examples of the binder include polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, nitrocellulose, and the like, in addition to polyvinylidene fluoride (PVDF) which is a typical example.

The graphene 104 serves as a conductive additive forming an electron conducting path between the active materials and between the active material and the current collector. When graphene oxide is used as a raw material of the graphene 104 and reduced to form the graphene 104, oxygen contained in the graphene oxide is not extracted entirely and remains partly in the graphene 104. When the graphene 104 contains oxygen, the proportion of the oxygen is greater than or equal to 2 atomic % and less than or equal to 20 atomic %, preferably greater than or equal to 3 atomic % and less than or equal to 15 atomic %.

To make surface contact with a plurality of active materials 103, the graphene 104 preferably have sides the length of each of which is greater than or equal to 50 nm and less than or equal to 100 μm, more preferably greater than or equal to 800 nm and less than or equal to 20 μm.

In one embodiment of the present invention, the proportion of graphene in the active material layer 102 is preferably greater than or equal to 0.1 wt % and less than or equal to 1.0 wt %.

There is no particular limitation on the compounding ratio of the active material 103 to the binder. However, as the proportion of the active material 103 is increased, the density of the active material is increased while the amount of the binder is decreased, which makes it difficult to maintain electrode strength. Conversely, as the proportion of the binder is increased, the electrode strength is increased while the density of the active material is decreased. Thus, the compounding ratio is preferably set as appropriate depending on characteristics of a battery to be fabricated. For example, the proportion of the binder is preferably greater than or equal to 5 wt % and less than or equal to 8 wt %.

In the active material layer with the above-described compounding ratio, the plurality of active materials 103 each coated with the carbon layer 105 is in contact with each other and the graphene 104 is in surface contact with the plurality of active materials 103 as illustrated in FIG. 1C, resulting in an increase in the conductivity of the active material layer 102. On the other hand, the addition amount of the graphene 104 used as a conductive additive can be reduced because the surface of the active material 103 is coated with the carbon layer 105, which makes it possible to prevent a decline in the electrode strength accompanied by an increase in the addition amount of the graphene 104.

The above-described positive electrode for a secondary battery enables both good battery characteristics and electrode strength at a predetermined level.

This embodiment can be implemented combining with any of the other embodiments as appropriate.

Embodiment 2

In this embodiment, a method for fabricating the positive electrode for a secondary battery described in Embodiment 1 is described with reference to FIG. 2.

Figure 2:
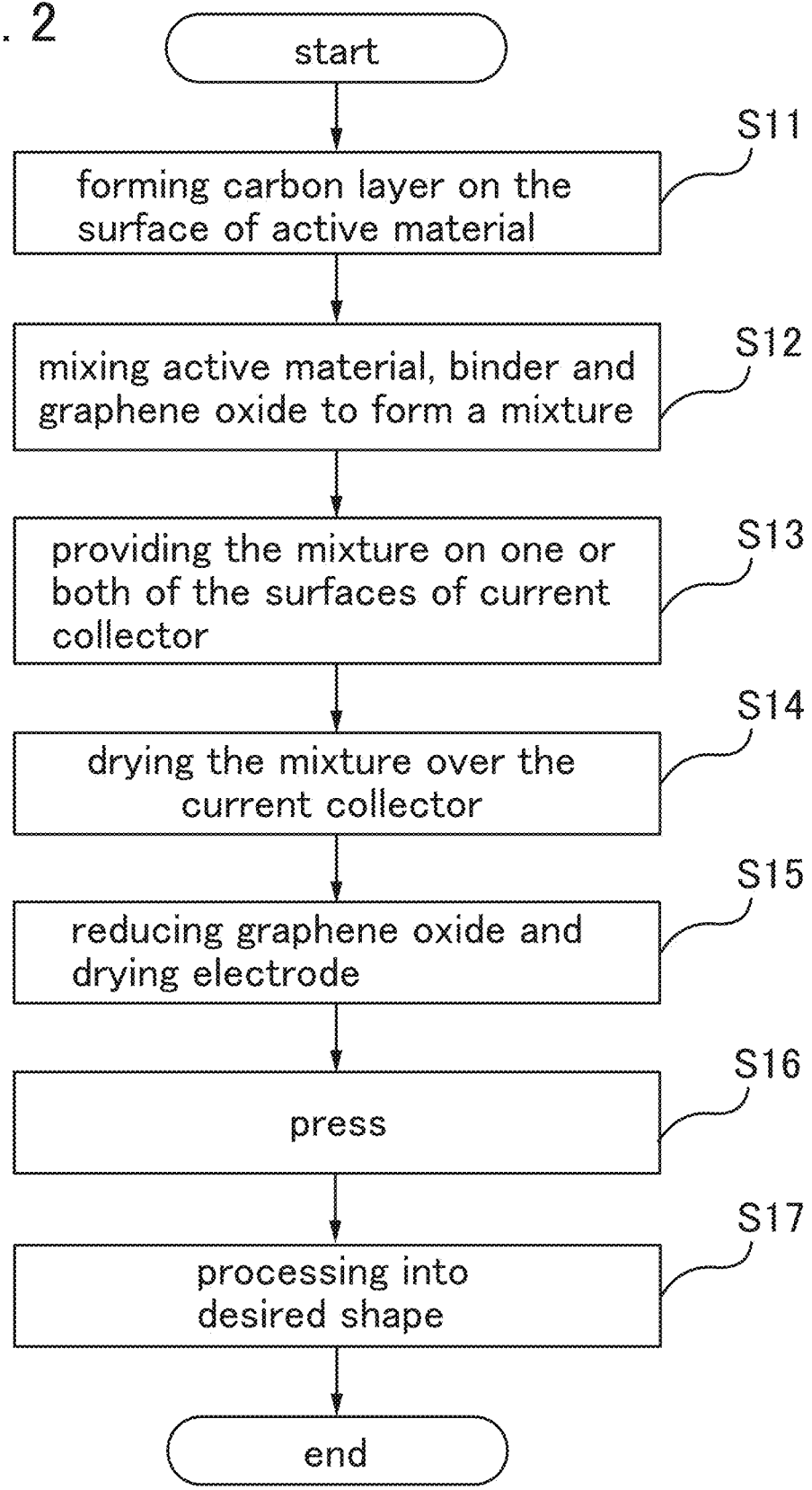
FIG. 2 is a flow chart of a method for fabricating a positive electrode.

FIG. 2 is a flow chart showing the method for fabricating the positive electrode for a secondary battery of one embodiment of the present invention. First, the active material 103 to be included in the active material layer 102 of the positive electrode 100 is formed, and the carbon layer 105 is formed on the surface of the active material 103 (Step S11).

For the active material 103, any of the materials given in Embodiment 1, such as lithium iron phosphate ($LiFePO_4$), can be used. The carbon layer 105 can be formed on the surface of the active material 103, for example, by mixing the active material 103 and a raw material of the carbon layer in acetone, water, or the like. The active material 103 is baked at, for example, approximately 600° C. with its surface entirely or partly coated with the raw material of the carbon layer by the mixing, whereby the raw material of the carbon layer is carbonized to form the carbon layer 105.

As the raw material of the carbon layer 105, carbohydrate such as a saccharide, e.g., glucose, fructose, cellulose, or sucrose, can be used.

Formation of the carbon layer 105 enables the active material 103 to have high conductivity. The carbon layer 105 is amorphous, and is provided to entirely or partly cover a surface of a particulate active material. The carbon layer 105 with an extremely small thickness does not contribute to an increase in the conductivity of the electrode, whereas the carbon layer 105 with an extremely large thickness decreases the density of the active material. For this reason, the thickness may be set as appropriate depending on desired battery characteristics. For example, the carbon layer 105 may have a thickness of more than or equal to 1 nm and less than or equal to 50 nm, preferably more than or equal to 5 nm and less than or equal to 10 nm.

Next, the active material coated with the carbon layer 105, a binder, and graphene oxide are mixed, so that a mixture is prepared (Step S12).

As described in Embodiment 1, examples of the binder include polyvinylidene fluoride (PVDF), polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, nitrocellulose, and the like.

Graphene oxide is used as a raw material of the graphene 104 serving as a conductive additive later. Graphene oxide can be formed by various synthesis methods such as a Hummers method, a modified Hummers method, and oxidation of graphite. Note that the method for fabricating the positive electrode for a secondary battery of one embodiment of the present invention is not limited by the degree of separation of graphene oxides. The positive electrode can be fabricated whether the graphene oxide is easily separated or not.

For example, the Hummers method is a method for forming graphite oxide by oxidizing graphite such as flake graphite. The formed graphite oxide is graphite which is oxidized in places, and thus a functional group, e.g., a carbonyl group such as a carboxyl group or a hydroxyl group, is bonded thereto. The crystallinity of the graphite is decreased, and the distance between layers of the graphite is increased. Therefore, the layers can be easily separated by ultrasonic treatment or the like to obtain graphene oxide.

The length of one side (also referred to as a flake size) of the graphene oxide is more than or equal to 50 nm and less than or equal to 100 μm, preferably more than or equal to 800 nm and less than or equal to 20 μm. Particularly in the case where the flake size is smaller than the average diameter of the particulate active material 103, surface contact with the plurality of active materials 103 is difficult, resulting in difficulty in increasing the electron conductivity of the active material layer 102.

The graphene oxide, the active material 103 coated with the carbon layer 105, and the binder described above are added to a polar solvent such as N-methyl-2-pyrrolidone (NMP) or dimethylformamide, and they are mixed to prepare a paste mixture.

Here, in the mixture without the above-described polar solvent (that is, the mixture of the active material 103, the graphene oxide, and the binder), the proportion of the graphene oxide is preferably greater than or equal to 0.2 wt % and less than or equal to 1.0 wt %.

There is no particular limitation on the compounding ratio of the active material 103 to the binder. However, as the proportion of the active material 103 is increased, the density of the active material is increased while the amount of the binder is decreased, which makes it difficult to maintain electrode strength. Conversely, as the proportion of the binder is increased, the electrode strength is increased while the density of the active material is decreased. Thus, the compounding ratio is preferably set as appropriate depending on characteristics of a battery to be fabricated. For example, the proportion of the binder is preferably greater than or equal to 5 wt % and less than or equal to 8 wt %.

The paste mixture is formed by adding the active material 103, the binder, and the graphene oxide to the polar solvent; however, there is no particular limitation on the order of the addition to the polar solvent. That is, the active material 103, the graphene oxide, and the binder may be added to the polar solvent in this order, or the graphene oxide, the active material 103, and the binder may be added to the polar solvent in this order, for example.

In the mixing step, ultrasonic vibration may be applied as appropriate to promote dispersion of a solute or the polar solvent may be further added as appropriate to adjust the viscosity of the mixture.

Next, the mixture prepared in Step S12 is provided on one or both of the surfaces of the current collector 101 by a roll coating method using an applicator roll or the like, a screen printing method, a doctor blade method, a coating method such as a spin coating method or a bar coating method, or the like (Step S13).

Note that the surface of the current collector 101 where the mixture is provided may be subjected to base treatment in advance in order to increase the adhesion between the active material layer 102 and the current collector 101, for example.

The mixture provided over the current collector 101 is dried by a method such as ventilation drying or reduced pressure (vacuum) drying (Step S14). The drying may be performed for more than or equal to 1 minute and less than or equal to 10 hours, preferably more than or equal to 1 minute and less than or equal to 1 hour with the use of hot air at higher than or equal to 50° C. and lower than or equal to 170° C. Through this step, the polar solvent contained in the active material layer 102 is evaporated. There is no particular limitation on the atmosphere.

Next, heat treatment for reducing the graphene oxide and dying the electrode is performed (Step S15). In the drying, heating is performed, for example, at higher than or equal to 130° C. and lower than or equal to 200° C. in a reduced-pressure atmosphere for more than or equal to 10 hours and less than or equal to 30 hours. Thus, the polar solvent remaining in the mixture is evaporated and oxygen in the graphene oxide is extracted. As a result, the graphene oxide can be formed into graphene. The weight of the graphene formed in the reduction treatment is about half of the weight of the graphene oxide.

Note that oxygen in the graphene oxide is not necessarily entirely extracted and may partly remain in the graphene. When the graphene 104 contains oxygen, the proportion of oxygen is greater than or equal to 2 atomic % and less than or equal to 20 atomic %, preferably greater than or equal to 3 atomic % and less than or equal to 15 atomic %.

Note that the reduction treatment of the graphene oxide is not limited to the above-described reduction by heating (hereinafter referred to as thermal reduction). The reduction treatment may be performed by a reduction method different from the thermal reduction, e.g., reduction caused by a chemical reaction using a reducer such as hydrazine (hereinafter referred to as chemical reduction) or electrochemical reduction performed by applying a potential at which graphene oxide is reduced to an electrode in an electrolyte solution (hereinafter referred to as electrochemical reduction).

Next, the electrode is pressed (pressure is applied to the electrode) to compress the active material layer (Step S16).

Note that a pressing step may also be performed between Step S14 and Step S15, in which case pressing is performed with a gap equal to that in Step S16 and the electrode is compressed so that the thickness thereof is reduced by approximately 20%. Thus, the density of the electrode and the density of the active material can be increased.

A stacked structure body formed in the above-described manner is processed into a desired shape to fabricate the positive electrode for a secondary battery (Step S17).

The positive electrode for a secondary battery fabricated by the above-described method enables both good battery characteristics and electrode strength at a predetermined level.

This embodiment can be implemented combining with any of the other embodiments as appropriate.

Embodiment 3

In this embodiment, a variety of secondary batteries each using the positive electrode for a secondary battery described in Embodiment 1 are described with reference to FIGS. 3A and 3B and FIGS. 4A and 4B.

(Coin-Type Secondary Battery)

Figure 3A:
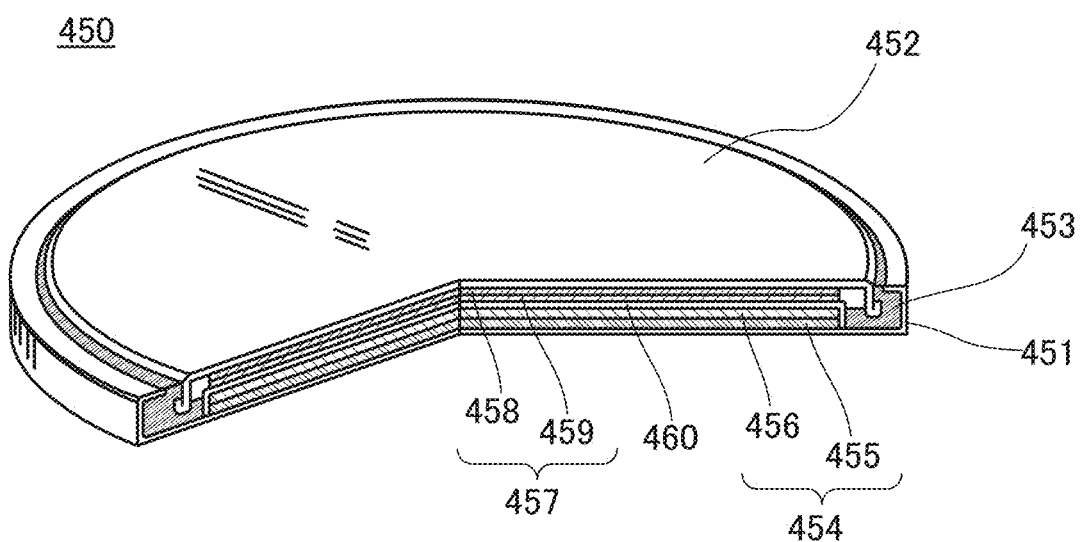
FIGS. 3A and 3B illustrate a coin-type secondary battery and a laminated secondary battery.

FIG. 3A is an external view of a coin-type (single-layer flat type) secondary battery, part of which also illustrates a cross-sectional view of part of the coin-type secondary battery.

In a coin-type secondary battery 450, a positive electrode can 451 serving also as a positive electrode terminal and a negative electrode can 452 serving also as a negative electrode terminal are insulated and sealed with a gasket 453 formed of polypropylene or the like. A positive electrode 454 includes a positive electrode current collector 455 and a positive electrode active material layer 456 which is provided to be in contact with the positive electrode current collector 455. A negative electrode 457 is formed of a negative electrode current collector 458 and a negative electrode active material layer 459 which is provided to be in contact with the negative electrode current collector 458. A separator 460 and an electrolyte solution (not illustrated) are included between the positive electrode active material layer 456 and the negative electrode active material layer 459.

As the positive electrode 454, the positive electrode 100 described in any of the above embodiments is used.

As the negative electrode 457, any of a variety of negative electrodes can be used. For example, the negative electrode 457 can be composed of the negative electrode current collector 458 and the negative electrode active material layer 459 provided thereover.

The negative electrode 457 is formed in such a manner that the negative electrode active material layer 459 is formed over the negative electrode current collector 458 by a CVD method, a sputtering method, or a coating method.

For the negative electrode current collector 458, it is possible to use a highly conductive material, for example, a metal such as aluminum, copper, nickel, or titanium, an alloy of aluminum and nickel, or an alloy of aluminum and copper. The negative electrode current collector 458 can have a foil-like shape, a plate-like shape (sheet-like shape), a net-like shape, a cylindrical shape, a coil shape, a punching-metal shape, an expanded-metal shape, or the like, as appropriate. The negative electrode current collector 458 preferably has a thickness of more than or equal to 10 µm and less than or equal to 30 µm.

There is no particular limitation on the material for the negative electrode active material as long as it is a material into/from which carrier ions can be inserted and extracted. For the negative electrode active material, a lithium metal, a carbon-based material, silicon, an alloy-based material of tin or the like can be used, for example. Examples of the carbon-based material include natural graphite such as vein graphite, flake graphite, and amorphous graphite; artificial graphite such as meso-carbon microbeads (MCMB), pitch-based carbon fibers, pitch cokes, kish graphite, and highly oriented pyrolytic graphite (HOPG); carbon black; active carbon; carbon nanofibers; coke; and the like.

For the negative electrode active material, a metal which is alloyed and dealloyed with carrier ions to enable a charge/discharge reaction to occur can be used. Examples of the metal include Mg, Ca, Al, Si, Ge, Sn, Pb, As, Sb, Bi, Ag, Au, Zn, Cd, Hg, and the like. Such a metal has higher capacity than graphite. In particular, silicon (Si) has a significantly high theoretical capacity of 4200 mAh/g. For this reason, silicon is preferably used as the negative electrode active material. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, as the negative electrode active material, oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), molybdenum oxide ($MoO_2$), or the like can be used.

Further alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g).

A nitride containing lithium and a transition metal is preferably used, in which case lithium ions are included in the negative electrode active material, and thus the negative electrode active material can be used in combination with a material for a positive electrode active material which does not include lithium ions, such as $V_2O_5$ or $Cr_3O_8$. Note that even in the case of using a material containing lithium ions as the positive electrode active material, the nitride containing lithium and a transition metal can be used as the negative electrode active material by extracting lithium ions contained in the positive electrode active material in advance.

In the case where silicon is used for the negative electrode active material, amorphous silicon, microcrystalline silicon, polycrystalline silicon, or a combination thereof can be used. In general, when crystallinity is higher, electric conductivity of silicon is higher; thus, silicon can be used for a power storage device as an electrode having high conductivity. Meanwhile, in the case of amorphous silicon, more carrier ions such as lithium ions can be occluded than in the case of crystalline silicon; thus, discharge capacity can be increased.

The negative electrode active material layer 459 may be formed by a coating method in such a manner that a conductive additive or a binder is added to a negative electrode active material to form a negative electrode paste and the negative electrode paste is applied over the negative electrode current collector 458 and dried.

Next, as the separator 460, a porous insulator such as cellulose (paper), polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

As a solvent for the electrolyte solution, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio. The use of a gelled high-molecular material as the solvent for the electrolyte solution improves safety against liquid leakage and the like. Further, a secondary battery can be thinner and more lightweight. Typical examples of the gelled high-molecular material include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

As an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

For the positive electrode can 451 and the negative electrode can 452, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. The positive electrode can 451 and the negative electrode can 452 are electrically connected to the positive electrode 454 and the negative electrode 457, respectively.

The negative electrode 457, the positive electrode 454, and the separator 460 are immersed in the electrolyte solution. Then, as illustrated in FIG. 3A, the positive electrode can 451, the positive electrode 454, the separator 460, the negative electrode 457, and the negative electrode can 452 are stacked in this order with the positive electrode can 451 positioned at the bottom, and the positive electrode can 451 and the negative electrode can 452 are subjected to pressure bonding with the gasket 453 interposed therebetween. In such a manner, the coin-type secondary battery 450 is fabricated.

(Laminated Secondary Battery)

Figure 3B:
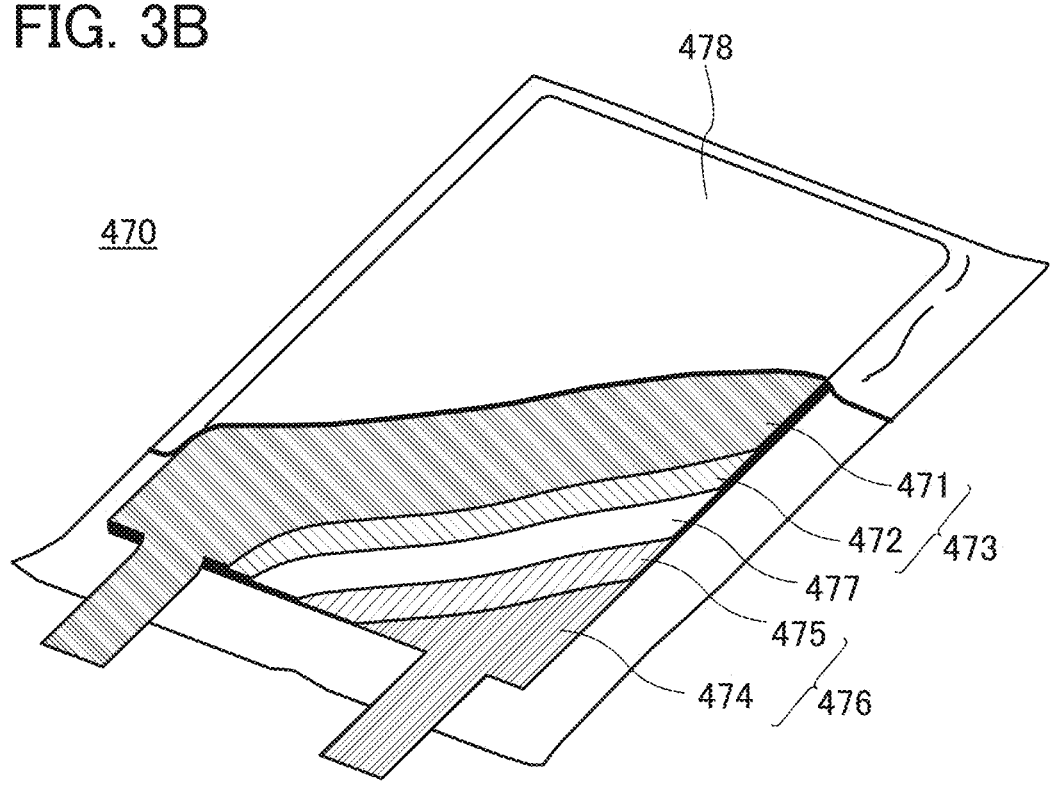

Next, an example of a laminated secondary battery is described with reference to FIG. 3B. In FIG. 3B, a structure inside the laminated secondary battery is partly exposed for convenience.

A laminated secondary battery 470 illustrated in FIG. 3B includes a positive electrode 473 including a positive electrode current collector 471 and a positive electrode active material layer 472, a negative electrode 476 including a negative electrode current collector 474 and a negative electrode active material layer 475, a separator 477, an electrolyte solution (not illustrated), and an exterior body 478. The separator 477 is placed between the positive electrode 473 and the negative electrode 476 provided in the exterior body 478. The exterior body 478 is filled with the electrolyte solution. Although the one positive electrode 473, the one negative electrode 476, and the one separator 477 are used in FIG. 3B, the secondary battery may have a stacked-layer structure in which positive electrodes, negative electrodes, and separators are alternately stacked.

As the positive electrode 473, the positive electrode 100 described in any of the above embodiments is used.

For the electrolyte solution, an electrolyte and a solvent which are similar to those in the above-described coin-type secondary battery can be used.

In the laminated secondary battery 470 illustrated in FIG. 3B, the positive electrode current collector 471 and the negative electrode current collector 474 also serve as terminals (tabs) for an electrical contact with the outside. For this reason, the positive electrode current collector 471 and the negative electrode current collector 474 are provided so that part of the positive electrode current collector 471 and part of the negative electrode current collector 474 are exposed outside the exterior body 478.

As the exterior body 478 in the laminated secondary battery 470, for example, a laminate film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. With such a three-layer structure, permeation of the electrolyte solution and a gas can be blocked and an insulating property and resistance to the electrolyte solution can be obtained.

(Cylindrical Secondary Battery)

Figure 4A:
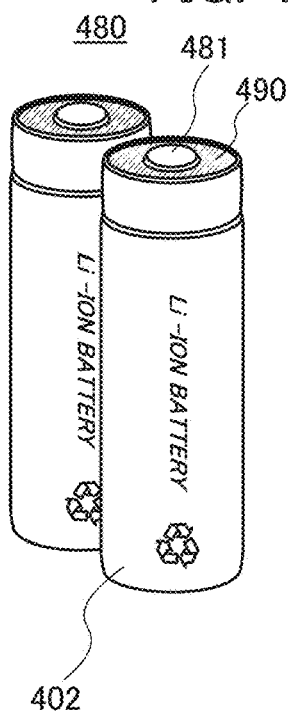
FIGS. 4A and 4B illustrate a cylindrical secondary battery.

Next, an example of a cylindrical secondary battery is described with reference to FIGS. 4A and 4B. As illustrated in FIG. 4A, a cylindrical secondary battery 480 includes a positive electrode cap (battery cap) 481 on a top surface and a battery can (outer can) 482 on the side surface and bottom surface. The positive electrode cap 481 and the battery can 482 are insulated from each other by a gasket (insulating packing) 490.

Figure 4B:
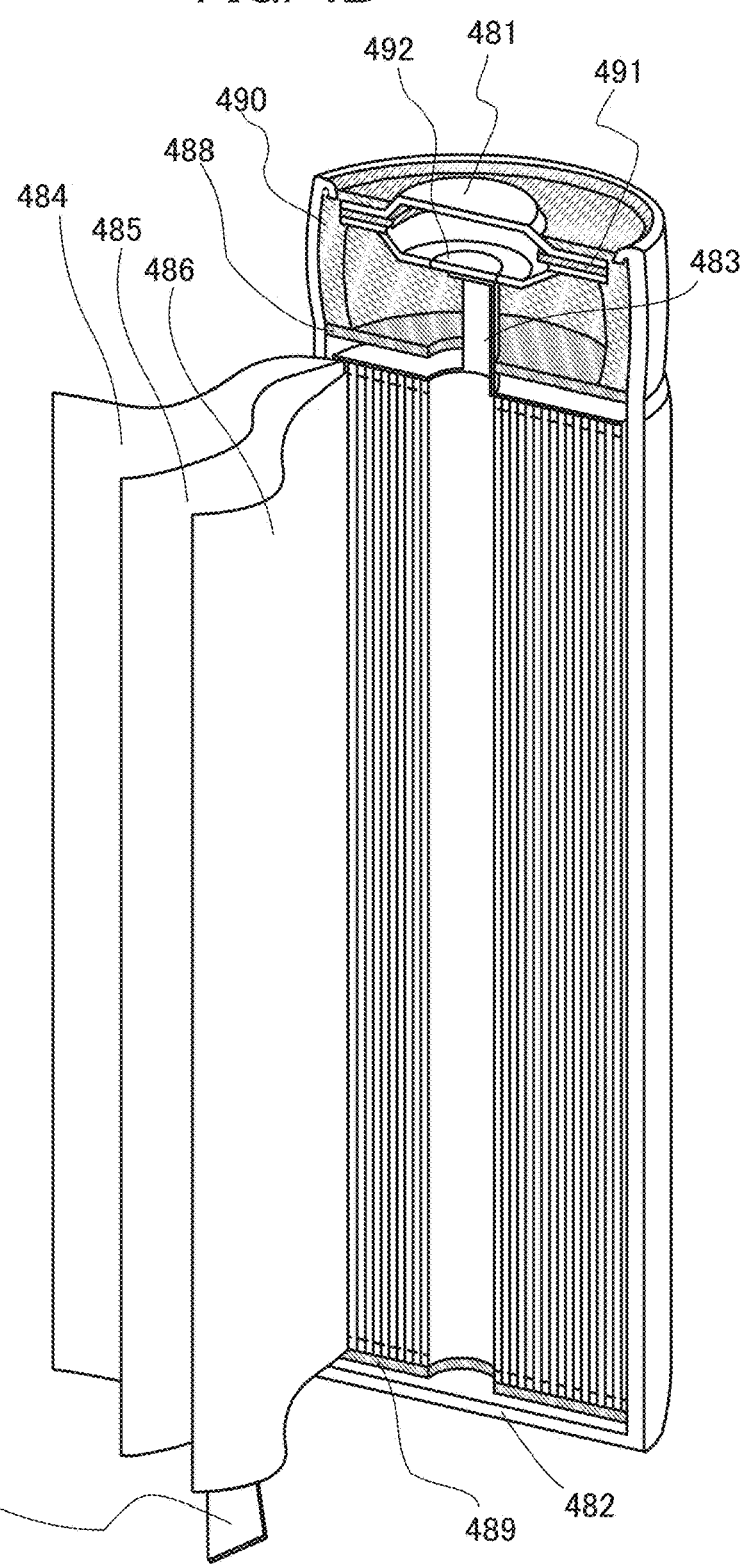

FIG. 4B is a diagram schematically illustrating a cross section of the cylindrical secondary battery. In the battery can 482 with a hollow cylindrical shape, a battery element is provided in which a strip-like positive electrode 484 and a strip-like negative electrode 486 are wound with a separator 485 provided therebetween. Although not illustrated, the battery element is wound around a center pin as a center. One end of the battery can 482 is close and the other end thereof is open.

As the positive electrode 484, the positive electrode 100 described in any of the above embodiments is used. Since the positive electrode for a secondary battery which is one embodiment of the present invention has electrode strength at a predetermined level, the positive electrode for a secondary battery can be wound and used.

For the battery can 482, a metal having a corrosion-resistant property to a liquid such as an electrolytic solution in charging and discharging a secondary battery, such as nickel, aluminum, or titanium; an alloy of any of the metals; an alloy containing any of the metals and another metal (e.g., stainless steel); a stack of any of the metals; a stack including any of the metals and any of the alloys (e.g., a stack of stainless steel and aluminum); or a stack including any of the metals and another metal (e.g., a stack of nickel, iron, and nickel) can be used. Inside the battery can 482, the battery element in which the positive electrode, the negative electrode, and the separator are wound is provided between a pair of insulating plates 488 and 489 which face each other.

An electrolyte solution (not illustrated) is injected inside the battery can 482 in which the battery element is provided. For the electrolyte solution, an electrolyte and a solvent which are similar to those in the above-described coin-type secondary battery can be used.

Since the positive electrode 484 and the negative electrode 486 of the cylindrical secondary battery are wound, active materials are formed on both sides of the current collectors. A positive electrode terminal (positive electrode current collecting lead) 483 is connected to the positive electrode 484, and a negative electrode terminal (negative electrode current collecting lead) 487 is connected to the negative electrode 486. A metal material such as aluminum can be used for both the positive electrode terminal 483 and the negative electrode terminal 487. The positive electrode terminal 483 and the negative electrode terminal 487 are resistance-welded to a safety valve mechanism 492 and the bottom of the battery can 482, respectively. The safety valve mechanism 492 is electrically connected to the positive electrode cap 481 through a positive temperature coefficient (PTC) element 491. In the case where an internal pressure of the battery is increased to exceed a predetermined threshold value, the safety valve mechanism 492 electrically disconnects the positive electrode cap 481 and the positive electrode 484. The PTC element 491 is a heat sensitive resistor whose resistance increases as temperature rises, and controls the amount of current by an increase in resistance to prevent unusual heat generation. Note that barium titanate ($BaTiO_3$)-based semiconductor ceramic or the like can be used for the PTC element.

Note that in this embodiment, the coin-type secondary battery, the laminated secondary battery, and the cylindrical secondary battery are given as examples of the secondary battery; however, any of secondary batteries with other various shapes, such as a sealed secondary battery and a square secondary battery, can be used. Further, a structure in which a plurality of positive electrodes, a plurality of negative electrodes, and a plurality of separators are stacked or rolled may be employed.

This embodiment can be implemented combining with any of the other embodiments as appropriate.

Embodiment 4

The secondary battery of one embodiment of the present invention can be used as a power source for a variety of electronic devices which can operate with electric power.

Specific examples of electronic devices each using the secondary battery of one embodiment of the present invention are as follows: display devices such as televisions and monitors, lighting devices, desktop personal computers and laptop personal computers, word processors, image reproduction devices which reproduce still images and moving images stored in recording media such as digital versatile discs (DVDs), portable compact disc (CD) players, radio receivers, tape recorders, headphone stereos, stereos, remote controls, table clocks, wall clocks, cordless phone handsets, transceivers, cell phones, car phones, portable game machines, passometers, calculators, portable information terminals, electronic notebooks, e-book readers, electronic translators, audio input devices, cameras such as video cameras and digital still cameras, toys, electric shavers, electric toothbrushes, high-frequency heating devices such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke sensors, and medical equipment such as hearing aids, cardiac pacemakers, and dialyzers. The examples also include industrial equipment such as guide lights, traffic lights, meters such as gas meters and water meters, belt conveyors, elevators, escalators, industrial robots, radio relay stations, cell phone base stations, power storage systems, and power storage devices for leveling the amount of power supply and smart grid. In addition, moving objects driven by motors using electric power from a secondary battery are also included in the category of electronic devices. Examples of the moving objects include electric vehicles (EV), hybrid electric vehicles (HEV) which include both an internal-combustion engine and a motor, plug-in hybrid electric vehicles (PHEV), tracked vehicles in which caterpillars are substituted for wheels of these vehicles, motorized bicycles including motor-assisted bicycles, motorcycles, electric wheelchairs, golf carts, boats, ships, submarines, aircrafts such as fixed wing aircrafts and rotorcrafts, rockets, artificial satellites, space probes, planetary probes, and spacecrafts.

In the above electronic devices, the secondary battery of one embodiment of the present invention can be used as a main power source for supplying enough power for almost the whole power consumption. Alternatively, in the above electronic devices, the secondary battery of one embodiment of the present invention can be used as an uninterruptible power source which can supply power to the electronic devices when the supply of power from the main power source or a commercial power source is stopped. Still alternatively, in the above electronic devices, the secondary battery of one embodiment of the present invention can be used as an auxiliary power source for supplying power to the electronic devices at the same time as the power supply from the main power source or a commercial power source.

Figure 5:
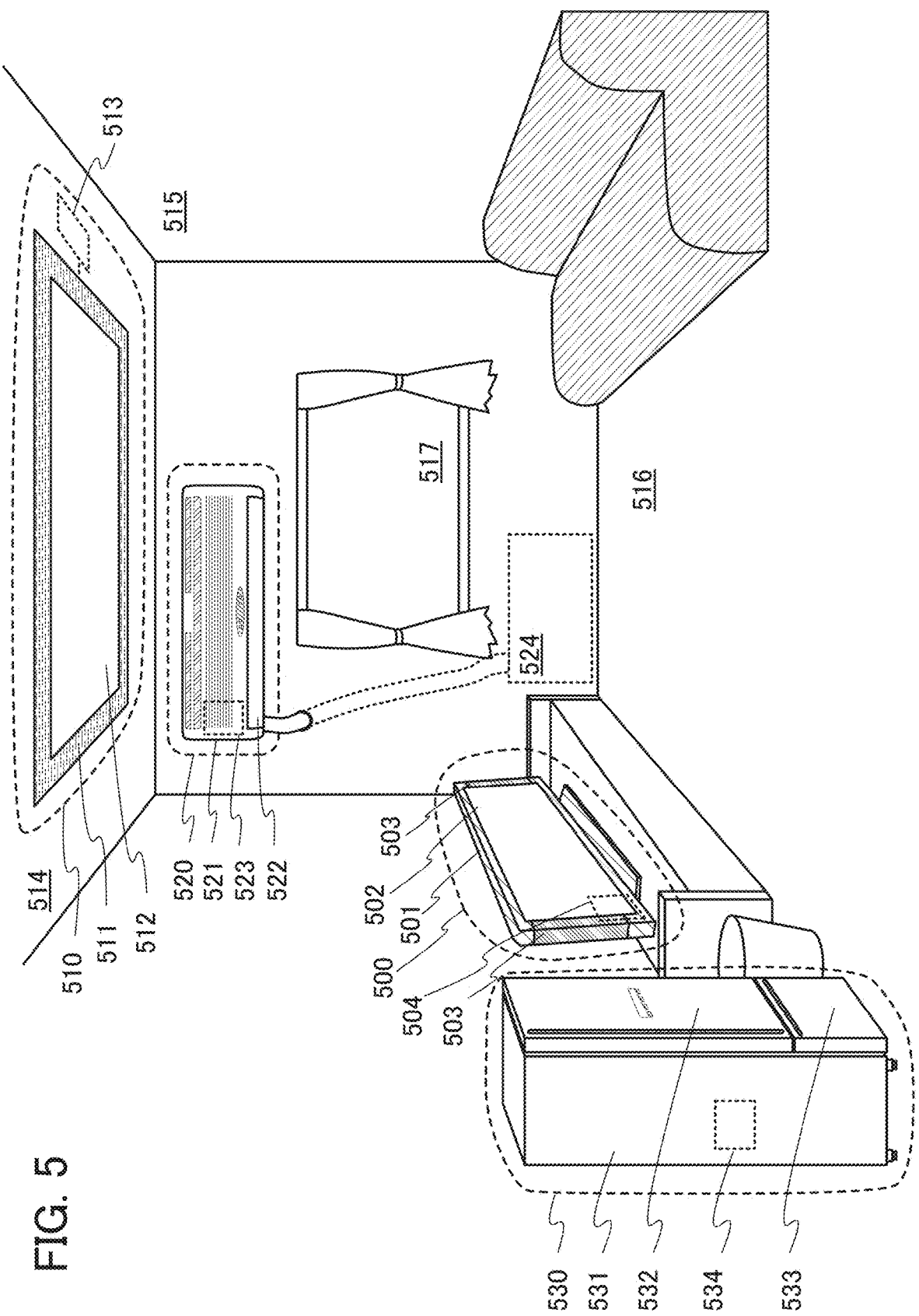
FIG. 5 illustrates electronic devices.

FIG. 5 illustrates specific structures of the electronic devices. In FIG. 5, a display device 500 is an example of an electronic device using a secondary battery 504 including the positive electrode for a secondary battery of one embodiment of the present invention. Specifically, the display device 500 corresponds to a display device for TV broadcast reception and includes a housing 501, a display portion 502, speaker portions 503, the secondary battery 504, and the like. The secondary battery 504 is provided in the housing 501. The display device 500 can receive power from a commercial power source. Alternatively, the display device 500 can use power stored in the secondary battery 504. Thus, the display device 500 can be operated with the use of the secondary battery 504 as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 502.

Note that the display device includes, in its category, all of information display devices for personal computers, advertisement displays, and the like in addition to TV broadcast reception.

In FIG. 5, an installation lighting device 510 is an example of an electronic device using a secondary battery 513 including the positive electrode for a secondary battery of one embodiment of the present invention. Specifically, the installation lighting device 510 includes a housing 511, a light source 512, the secondary battery 513, and the like. Although FIG. 5 illustrates the case where the secondary battery 513 is provided in a ceiling 514 on which the housing 511 and the light source 512 are installed, the secondary battery 513 may be provided in the housing 511. The installation lighting device 510 can receive power from a commercial power source. Alternatively, the installation lighting device 510 can use power stored in the secondary battery 513. Thus, the installation lighting device 510 can be operated with the use of the secondary battery 513 as an uninterruptible power source even when power cannot be supplied from a commercial power source due to power failure or the like.

Note that although the installation lighting device 510 provided in the ceiling 514 is illustrated in FIG. 5 as an example, the secondary battery 513 can be used as an installation lighting device provided in, for example, a wall 515, a floor 516, a window 517, or the like other than the ceiling 514. Alternatively, the secondary battery 513 can be used in a tabletop lighting device or the like.

As the light source 512, an artificial light source which emits light artificially by using power can be used. Specifically, an incandescent lamp, a discharge lamp such as a fluorescent lamp, and a light-emitting element such as an LED and an organic EL element are given as examples of the artificial light source.

In FIG. 5, an air conditioner including an indoor unit 520 and an outdoor unit 524 is an example of an electronic device using a secondary battery 523 including the positive electrode for a secondary battery of one embodiment of the present invention. Specifically, the indoor unit 520 includes a housing 521, an air outlet 522, the secondary battery 523, and the like. Although FIG. 5 illustrates the case where the secondary battery 523 is provided in the indoor unit 520, the secondary battery 523 may be provided in the outdoor unit 524. Alternatively, the secondary battery 523 may be provided in both the indoor unit 520 and the outdoor unit 524. The air conditioner can receive power from a commercial power source. Alternatively, the air conditioner can use power stored in the secondary battery 523. Particularly in the case where the secondary batteries 523 are provided in both the indoor unit 520 and the outdoor unit 524, the air conditioner can be operated with the use of the secondary batteries 523 as uninterruptible power sources even when power cannot be supplied from a commercial power source due to power failure or the like.

Note that although the split-type air conditioner including the indoor unit and the outdoor unit is illustrated in FIG. 5 as an example, the secondary battery 523 including the positive electrode for a secondary battery of one embodiment of the present invention can be used in an air conditioner in which the functions of an indoor unit and an outdoor unit are integrated in one housing.

In FIG. 5, an electric refrigerator-freezer 530 is an example of an electronic device using a secondary battery 534 including the positive electrode for a secondary battery of one embodiment of the present invention. Specifically, the electric refrigerator-freezer 530 includes a housing 531, a door for a refrigerator 532, a door for a freezer 533, the secondary battery 534, and the like. The secondary battery 534 is provided inside the housing 531 in FIG. 5. The electric refrigerator-freezer 530 can receive power from a commercial power source. Alternatively, the electric refrigerator-freezer 530 can use power stored in the secondary battery 534. Thus, the electric refrigerator-freezer 530 can be operated with the use of the secondary battery 534 as an uninterruptible power source even when power cannot be supplied from a commercial power source due to power failure or the like.

Note that among the electronic devices described above, the high-frequency heating devices such as microwave ovens and the electric rice cookers require high power in a short time. The tripping of a circuit breaker of a commercial power source in use of the electronic devices can be prevented by using the secondary battery as an auxiliary power source for supplying power which cannot be supplied enough by a commercial power source.

In addition, in a time period when electronic devices are not used, particularly when the proportion of the amount of power which is actually used to the total amount of power which can be supplied from a commercial power source (such a proportion referred to as a usage rate of power) is low, power can be stored in the secondary battery, whereby the usage rate of power can be reduced in a time period when the electronic devices are used. For example, in the case of the electric refrigerator-freezer 530, power can be stored in the secondary battery 534 in nighttime when the temperature is low and the door for a refrigerator 532 and the door for a freezer 533 are not often opened and closed. On the other hand, in daytime when the temperature is high and the door for a refrigerator 532 and the door for a freezer 533 are frequently opened and closed, the secondary battery 534 is used as an auxiliary power source; thus, the usage rate of power in daytime can be reduced.

This embodiment can be implemented combining with any of the other embodiments as appropriate.

Embodiment 5

Next, a portable information terminal which is an example of a portable electronic device is described with reference to FIGS. 6A to 6C.

Figure 6A:
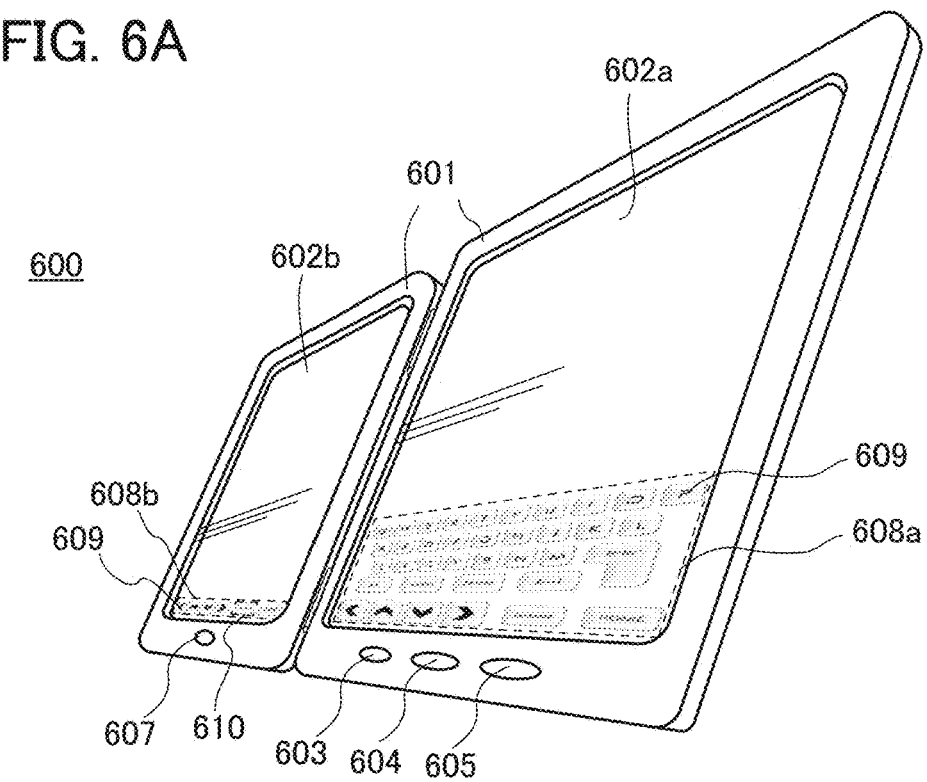
FIGS. 6A to 6C illustrate an electronic device.
Figure 6B:
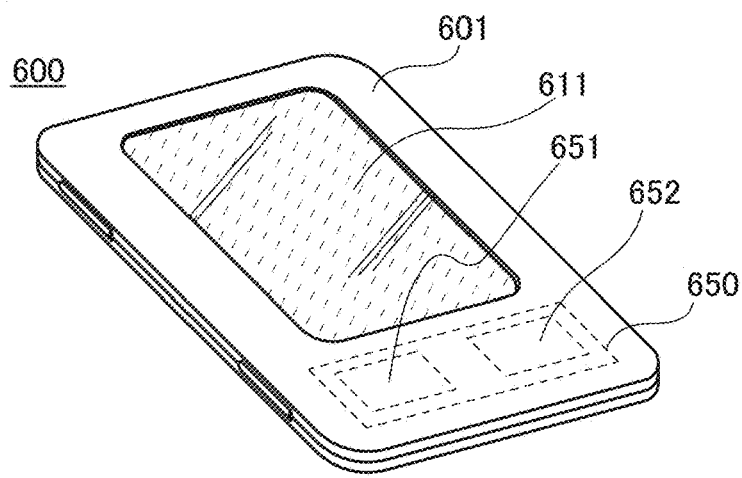

FIGS. 6A and 6B illustrate a tablet terminal 600 that can be folded. FIG. 6A illustrates the tablet terminal 600 in the state of being unfolded. The tablet terminal 600 includes a housing 601, a display portion 602a, a display portion 602b, a switch 603 for switching display modes, a power switch 604, a switch 605 for switching to power-saving mode, and an operation switch 607.

Part of the display portion 602a can be a touch panel region 608a and data can be input when a displayed operation key 609 is touched. Note that FIG. 6A illustrates, as an example, that half of the area of the display portion 602a has only a display function and the other half of the area has a touch panel function. However, the structure of the display portion 602a is not limited to this, and all the area of the display portion 602a may have a touch panel function. For example, all the area of the display portion 602a can display keyboard buttons and serve as a touch panel while the display portion 602b can be used as a display screen.

Like the display portion 602a, part of the display portion 602b can be a touch panel region 608b. When a finger, a stylus, or the like touches the place where a button 610 for switching to keyboard display is displayed in the touch panel, keyboard buttons can be displayed on the display portion 602b.

Touch input can be performed on the touch panel regions 608a and 608b at the same time.

The switch 603 for switching display modes can switch the display between portrait mode, landscape mode, and the like, and between monochrome display and color display, for example. With the switch 605 for switching to power-saving mode, the luminance of display can be optimized depending on the amount of external light at the time when the tablet terminal is in use, which is sensed with an optical sensor incorporated in the tablet terminal. The tablet terminal may include another detection device such as a sensor for sensing orientation (e.g., a gyroscope or an acceleration sensor) in addition to the optical sensor.

Although the display area of the display portion 602a is the same as that of the display portion 602b in FIG. 6A, the portable information terminal is not particularly limited thereto. The display area of the display portion 602a may be different from that of the display portion 602b, and further, the display quality of the display portion 602a may be different from that of the display portion 602b. For example, one of them may be a display panel that can display higher-definition images than the other.

FIG. 6B illustrates the tablet terminal 600 in the state of being closed. The tablet terminal 600 includes the housing 601, a solar cell 611, a charge and discharge control circuit 650, a battery 651, and a DCDC converter 652. Note that FIG. 6B illustrates an example in which the charge and discharge control circuit 650 includes the battery 651 and the DCDC converter 652, and the battery 651 includes a secondary battery including the positive electrode for a secondary battery of one embodiment of the present invention.

Since the tablet terminal 600 can be folded, the housing 601 can be closed when the tablet terminal 600 is not in use. Thus, the display portions 602a and 602b can be protected, thereby providing the tablet terminal 600 with excellent endurance and excellent reliability for long-term use.

The tablet terminal illustrated in FIGS. 6A and 6B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 611, which is attached on the surface of the tablet terminal 600, supplies power to the touch panel, the display portion, a video signal processor, and the like. Note that the solar cell 611 is preferably provided on one or both surfaces of the housing 601, in which case the battery 651 can be charged efficiently The structure and operation of the charge and discharge control circuit 650 illustrated in FIG. 6B are described with reference to a block diagram in FIG. 6C. The solar cell 611, the battery 651, the DCDC converter 652, a converter 653, switches SW1 to SW3, and the display portion 602 are illustrated in FIG. 6C, and the battery 651, the DCDC converter 652, the converter 653, and the switches SW1 to SW3 correspond to the charge and discharge control circuit 650 illustrated in FIG. 6B.

First, an example of the operation in the case where power is generated by the solar cell 611 using external light is described. The voltage of power generated by the solar cell 611 is raised or lowered by the DCDC converter 652 so that the power has a voltage for charging the battery 651. Then, when the power from the solar cell 611 is used for the operation of the display portion 602, the switch SW1 is turned on and the voltage of the power is raised or lowered by the converter 653 so as to be a voltage needed for the display portion 602. In addition, when display on the display portion 602 is not performed, the switch SW1 may be turned off and the switch SW2 may be turned on so that the battery 651 is charged.

Here, the solar cell 611 is described as an example of a power generation means; however, there is no particular limitation on the power generation means, and the battery 651 may be charged with another power generation means such as a piezoelectric element or a thermoelectric conversion element (Peltier element). For example, the battery 651 may be charged with a non-contact power transmission module that transmits and receives power wirelessly (without contact) to charge the battery or with a combination of other charging means.

Figure 6C:
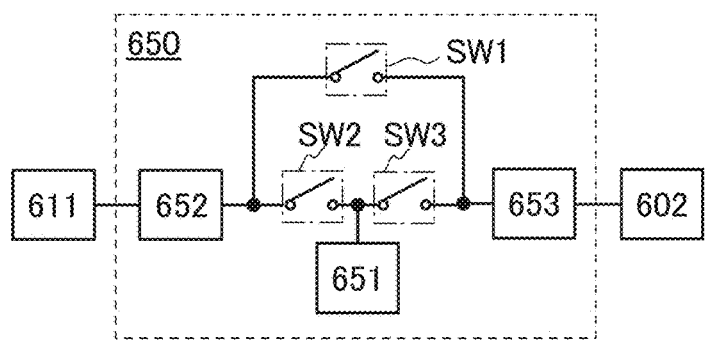

It is needless to say that one embodiment of the present invention is not limited to the electronic device illustrated in FIGS. 6A to 6C as long as the electronic device is equipped with the secondary battery including the positive electrode for a secondary battery of one embodiment of the present invention and described in any of the above embodiments.

Embodiment 6

An example of the moving object which is an example of the electronic devices is described with reference to FIGS. 7A and 7B.

The secondary battery described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 7A:
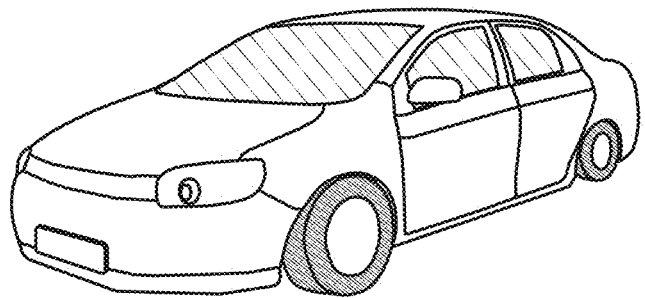
FIGS. 7A and 7B illustrate an electronic device.
Figure 7B:
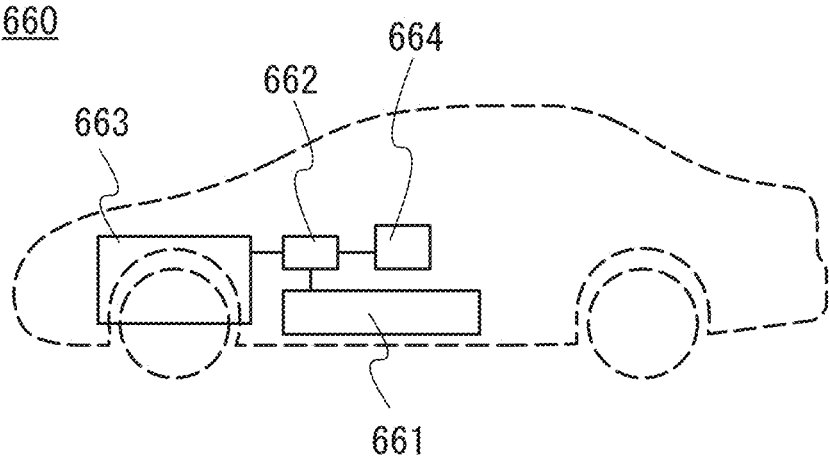

FIGS. 7A and 7B illustrate an example of an electric vehicle. An electric vehicle 660 is equipped with a battery 661. The output of power of the battery 661 is adjusted by a control circuit 662 and the power is supplied to a driving device 663. The control circuit 662 is controlled by a processing unit 664 including a ROM, a RAM, a CPU, or the like which is not illustrated.

The driving device 663 includes a DC motor or an AC motor either alone or in combination with an internal-combustion engine. The processing unit 664 outputs a control signal to the control circuit 662 based on input data such as data on operation (e.g., acceleration, deceleration, or stop) by a driver of the electric vehicle 660 or data on driving the electric vehicle 660 (e.g., data on an upgrade or a downgrade, or data on a load on a driving wheel). The control circuit 662 adjusts the electric energy supplied from the battery 661 in accordance with the control signal of the processing unit 664 to control the output of the driving device 663. In the case where the AC motor is mounted, although not illustrated, an inverter which converts direct current into alternate current is also incorporated.

The battery 661 can be charged by external electric power supply using a plug-in technique. For example, the battery 661 is charged by a commercial power source through a power plug. The battery 661 can be charged by converting external power into DC constant voltage having a predetermined voltage level through a converter such as an AC-DC converter. Providing a secondary battery including the positive electrode for a secondary battery of one embodiment of the present invention as the battery 661 can contribute to an increase in the capacity of the battery, so that convenience can be improved. When the battery 661 itself can be made compact and lightweight with improved characteristics of the battery 661, the vehicle can be made lightweight, leading to an increase in fuel efficiency.

Note that it is needless to say that the moving object is not limited to the electronic devices described above as long as the secondary battery including the positive electrode for a secondary battery of one embodiment of the present invention is included.

This embodiment can be implemented combining with any of the other embodiments as appropriate.

Example 1

(Formation of Electrode)

In this example, the positive electrode of one embodiment of the present invention was fabricated. A method for fabricating the positive electrode is described below.

Lithium iron phosphate ($LiFePO_4$) whose surface is provided with a carbon layer by the method described in Embodiment 2 and N-methyl-2-pyrrolidone (NMP) as a polar solvent were prepared. These were stirred and mixed in a mixer at 2000 rpm for 5 minutes, and ultrasonic vibration was applied for 3 minutes. In addition, stirring and mixing at 2000 rpm for 1 minute and application of ultrasonic vibration for 3 minutes were each performed twice, so that a mixture was formed. Next, graphene oxide was added to the mixture and stirring and mixing of the mixture in a mixer at 2000 rpm for 5 minutes were performed 5 times. Then, PVDF was added as a binder and the mixture was stirred and mixed in a mixer at 2000 rpm for 5 minutes. Moreover, NMP was added to adjust the viscosity, and the mixture was stirred and mixed at 2000 rpm for 1 minute. The $LiFePO_4$ provided with the carbon layer, the graphene oxide, and the PVDF were weighed and adjusted so that the compounding ratio thereof (excluding the polar solvent) was 94.4:0.6:5.0 (weight percent) in the formed mixture.

The mixture formed in such a manner was applied over aluminum foil serving as a current collector at a rate of 10 mm/sec with the use of an applicator. This was dried in hot air at 80° C. for 40 minutes to volatilize the polar solvent, and then pressing was conducted to compress an active material layer so that the thickness of the electrode was reduced by approximately 20%.

Next, heating was performed at 170° C. in a reduced pressure atmosphere for 10 hours so that the electrode is dried and the graphene oxide is reduced to form graphene serving as a conductive additive.

Then, pressing was conducted again with a gap equal to that in the above pressing to compress the active material layer, and the layer was stamped out to fabricate a positive electrode for a secondary battery.

(Observation of Active Material Layer)

Next, to visually check a structure of an active material layer, the active material layer formed under the above-described conditions was observed with a scanning electron microscope (SEM).

Figure 8A:
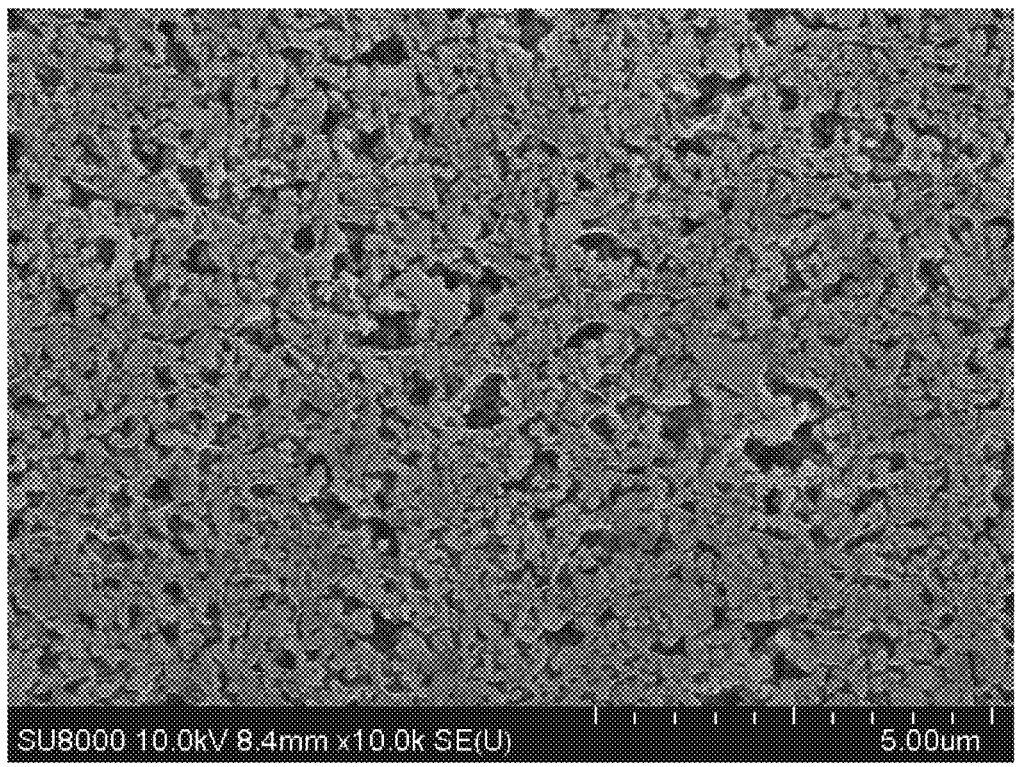
FIGS. 8A and 8B illustrate a cross section of an active material layer observed with SEM.
Figure 8B:
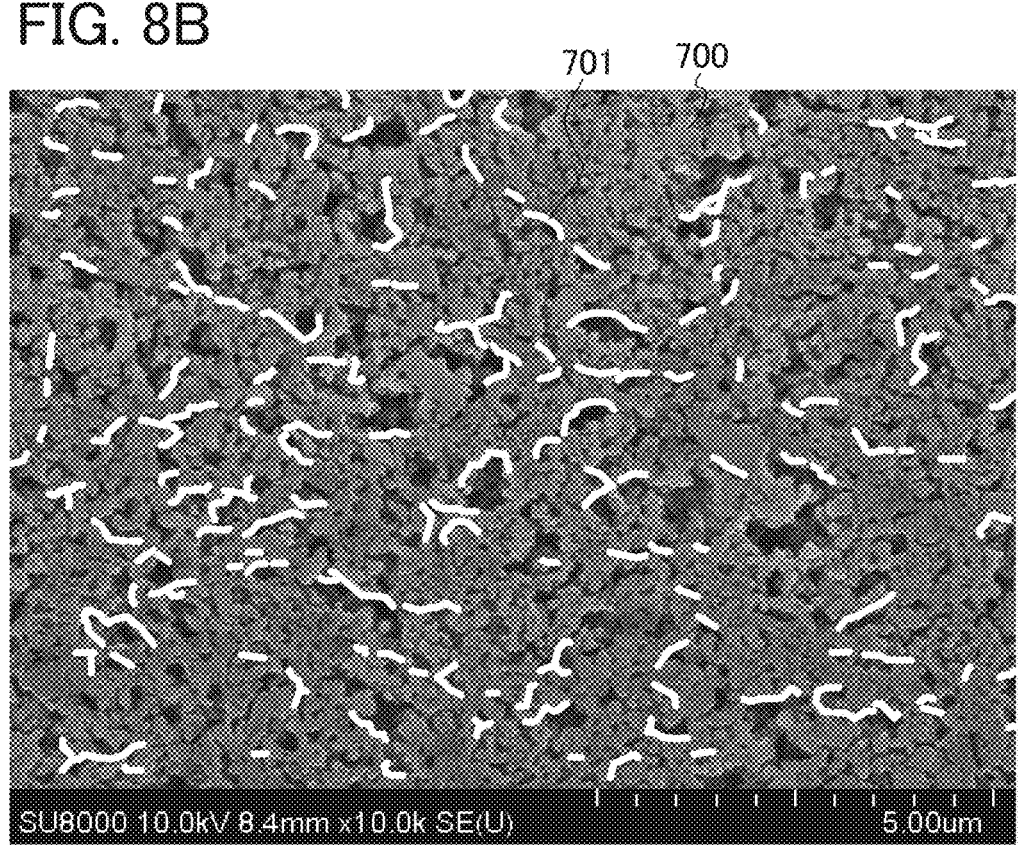

FIGS. 8A and 8B are SEM images of a cross section of the active material layer. In the SEM images, a plurality of active material particles is seen. In part of the image, aggregated active material particles can also be seen. Here, white thread- or string-like portions correspond to graphene. Graphene can be seen like a thread or a string in a gap (void) between the plurality of active material particles and also adheres to the surfaces of the active material particles. In FIG. 8B, some graphene in the SEM image in FIG. 8A is highlighted by white heavy lines. Graphene 701 makes surface contact with a plurality of active material particles 700 and disperses three-dimensionally in the active material layer. This indicates that the graphene 701 forms an electron conducting path in the active material layer to increase the conductivity of the active material layer.

(Evaluation of Discharge Characteristics)

The positive electrode for a secondary battery fabricated as described above was incorporated in a half cell and discharge characteristics of the cell were measured. The cell was in the form of a coin-type cell of a CR2032 type (20 mm in diameter and 3.2 mm high). Lithium foil was used as a negative electrode and a 25 μm-thick polypropylene (PP) film was used as a separator. An electrolyte solution to be used was formed in such a manner that lithium hexafluorophosphate ($LiPF_6$) was dissolved at a concentration of 1 mol/L in a solution in which ethylene carbonate (EC) and diethyl carbonate (DEC) were mixed at a volume ratio of 1:1. In charging, CCCV at 0.2 C was employed and the upper limit voltage was set to 4.3 V. In discharging, CC at all the rates, 0.2 C, 1 C, and 5 C, was employed and the lower limit voltage was set to 2 V. The measurement temperature was 25° C. A value of discharge capacity at a lower limit voltage of 2 V was the maximum value of the discharge capacity.

Figure 9:
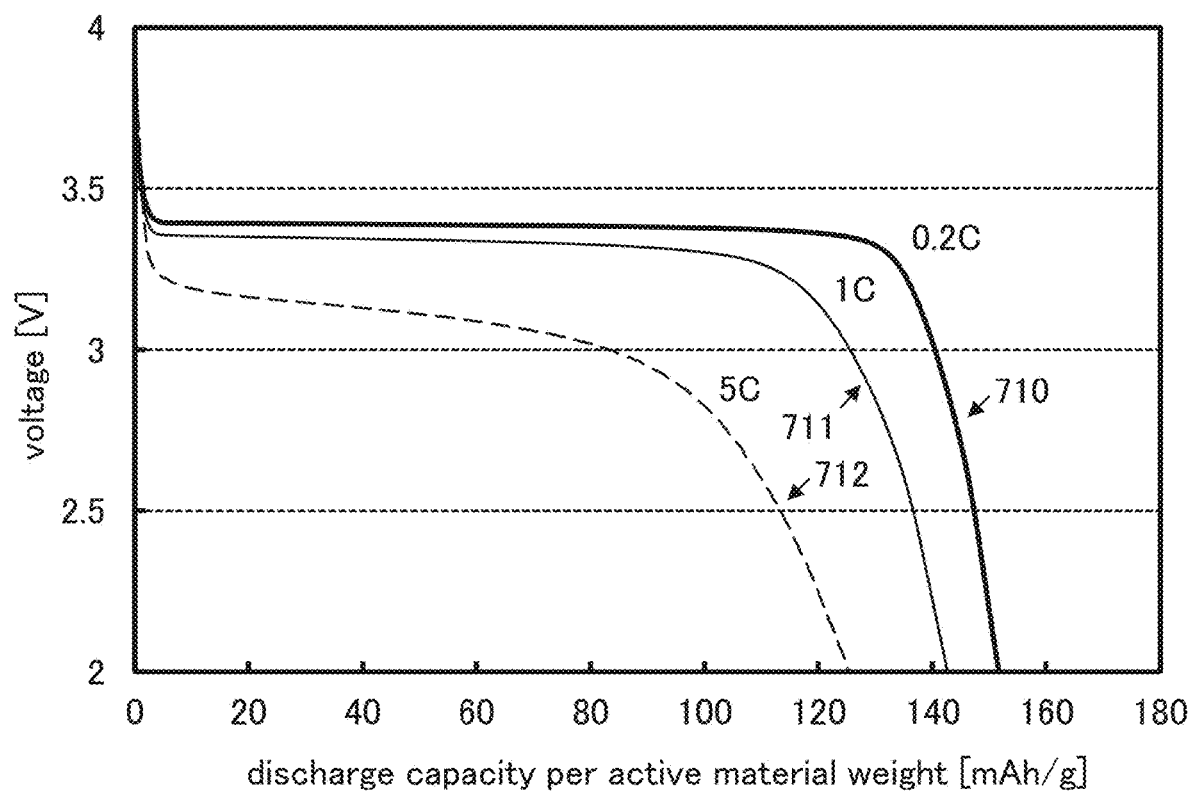
FIG. 9 is a graph showing discharge characteristics.

FIG. 9 shows measurement results of the discharge characteristics of the cell. The horizontal axis represents discharge capacity per active material weight (unit: mAh/g) and the vertical axis represents voltage (unit: volt). The results at discharging rates of 0.2 C, 1 C, and 5 C are shown by a discharge curve 710 (heavy line), a discharge curve 711 (solid line), and a discharge curve 712 (dashed line), respectively.

At a discharging rate of 0.2 C, the discharge curve 710 has a plateau region when the discharge capacity is from 5 mAh/g to 130 mAh/g and thus shows good characteristics. Also at a discharging rate of 1 C, a plateau region which is wide enough can be observed. The charge curve 711 has a plateau region in 60% or more of a measuring range of the discharge capacity. In addition, at a discharging rate of 5 C, a plateau region is smaller than those at 0.2 C and 1 C; however, the fabricated positive electrode was found to sufficiently serve as a positive electrode for a secondary battery.

The maximum value of the discharge capacity is 152 mAh/g at a discharging rate of 0.2 C, 143 mAh/g at 1 C, and 125 mAh/g at 5 C. The discharge capacity is more than or equal to 140 mAh/g when the discharging rate is 1 C, which is a good result.

The above results show that the positive electrode for a secondary battery including the active material layer in which the compounding ratio of $LiFePO_4$ provided with the carbon layer to graphene oxide and PVDF (excluding the polar solvent) was 94.4:0.6:5.0 (unit: wt %) had excellent performance.

Next, cells including the mixture with different proportions of graphene oxide of 0 wt %, 0.2 wt %, 0.4 wt %, and 1 wt % were fabricated, and the discharging characteristics of these cells were measured. The measurement results were compared with those of a cell in which the proportion of graphene oxide in the mixture was 0.6 wt %.

Here, the proportion of PVDF in the mixture was fixed to 5 wt %. A fabrication process of positive electrodes and conditions for fabricating the cells except the proportion of graphene oxide serving as a raw material of a conductive additive were similar to those of the cell in which the proportion of graphene oxide in the mixture was 0.6 wt %. A surface of an active material was coated with a carbon layer in each cell.

Figure 10:
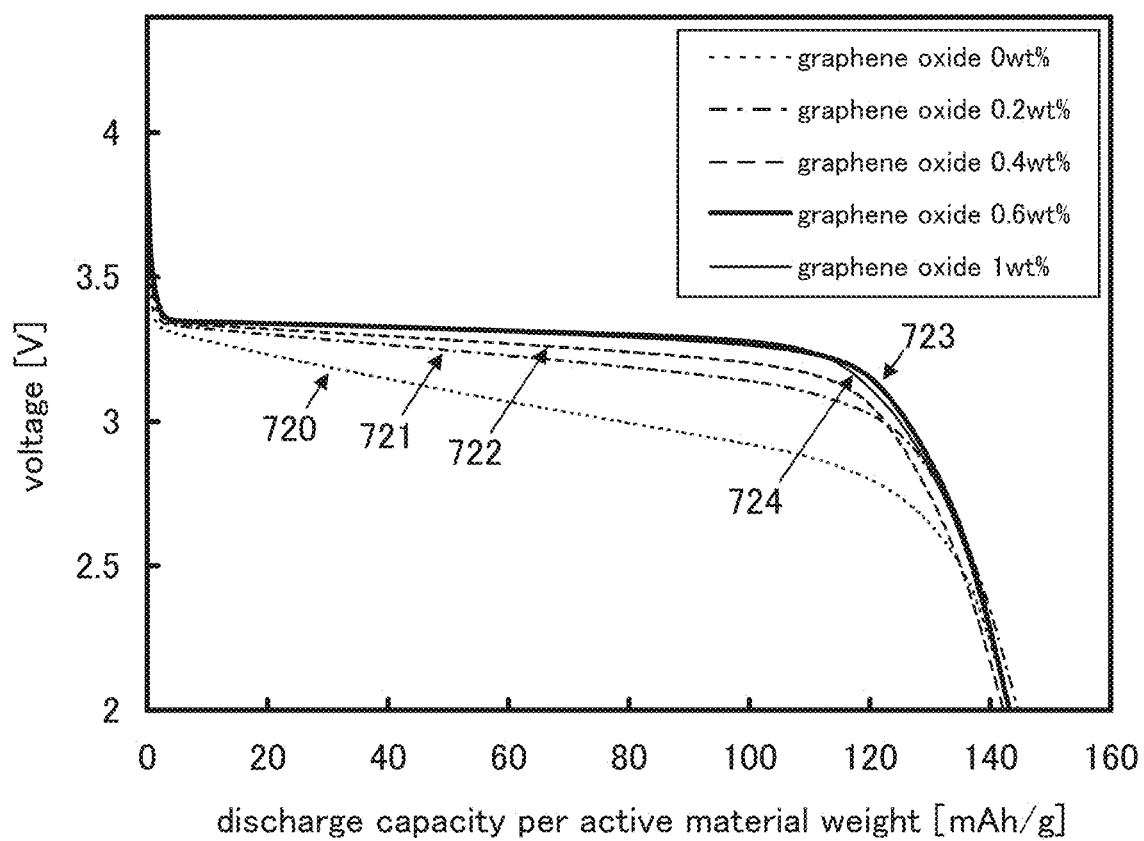
FIG. 10 is a graph showing discharge characteristics.

The discharge characteristics of the cells with different proportions of graphene oxide are shown in FIG. 10. The horizontal axis represents discharge capacity per active material weight (unit: mAh/g) and the vertical axis represents voltage (unit: volt). A discharge curve 720 shows discharge characteristics when the proportion of graphene oxide was 0 wt %. A discharge curve 721 shows discharge characteristics when the proportion of graphene oxide was 0.2 wt %. A discharge curve 722 shows discharge characteristics when the proportion of graphene oxide was 0.4 wt %. A discharge curve 724 shows discharge characteristics when the proportion of graphene oxide was 1 wt %. Discharge characteristics when the proportion of graphene oxide was 0.6 wt % is shown as a discharge curve 723 for comparison. The discharging rates of all of the cells were 1 C.

The discharge curve 723 of the cell in which the proportion of graphene oxide was 0.6 wt % substantially overlaps with the discharge curve 724 of the cell in which the proportion of graphene oxide was 1 wt %, which was higher than 0.6 wt %. Thus, it can be said that the discharge curves of the cells are equal to each other when the proportion of graphene oxide is greater than or equal to 0.6 wt % in each of the cells. On the other hand, in the case of the cells including the positive electrode in which the proportions of graphene oxide in the mixture were 0.4 wt % and 0.2 wt %, which were lower than 0.6 wt %, voltage was slightly decreased but not greatly changed, so that the shape of a plateau is almost the same as that of the cell in which the proportion of graphene oxide was 0.6 wt %, and there is no significant difference in the maximum values of the discharge capacity between the cells and the cell in which the proportion of graphene oxide was 0.6 wt %.

These results show that the conductivity of the active material layer is not lost and the discharge characteristics can be maintained even when a small amount of graphene oxide is added because the surface of the active material in the positive electrode is coated with the carbon layer.

As shown by the discharge curve 720, the cell in which the proportion of graphene oxide was 0 wt %, that is, graphene was not used as the conductive additive in the active material layer at all, had discharge characteristics which were much worse than those of the cells including graphene.

This result indicates that a small amount of graphene added to the active material layer had a large effect on the conductivity of the active material layer. With the use of graphene in the active material layer, the active materials have a better electrical contact, and the conductivity between the active materials each coated with the carbon layer is maintained.

Figure 11:
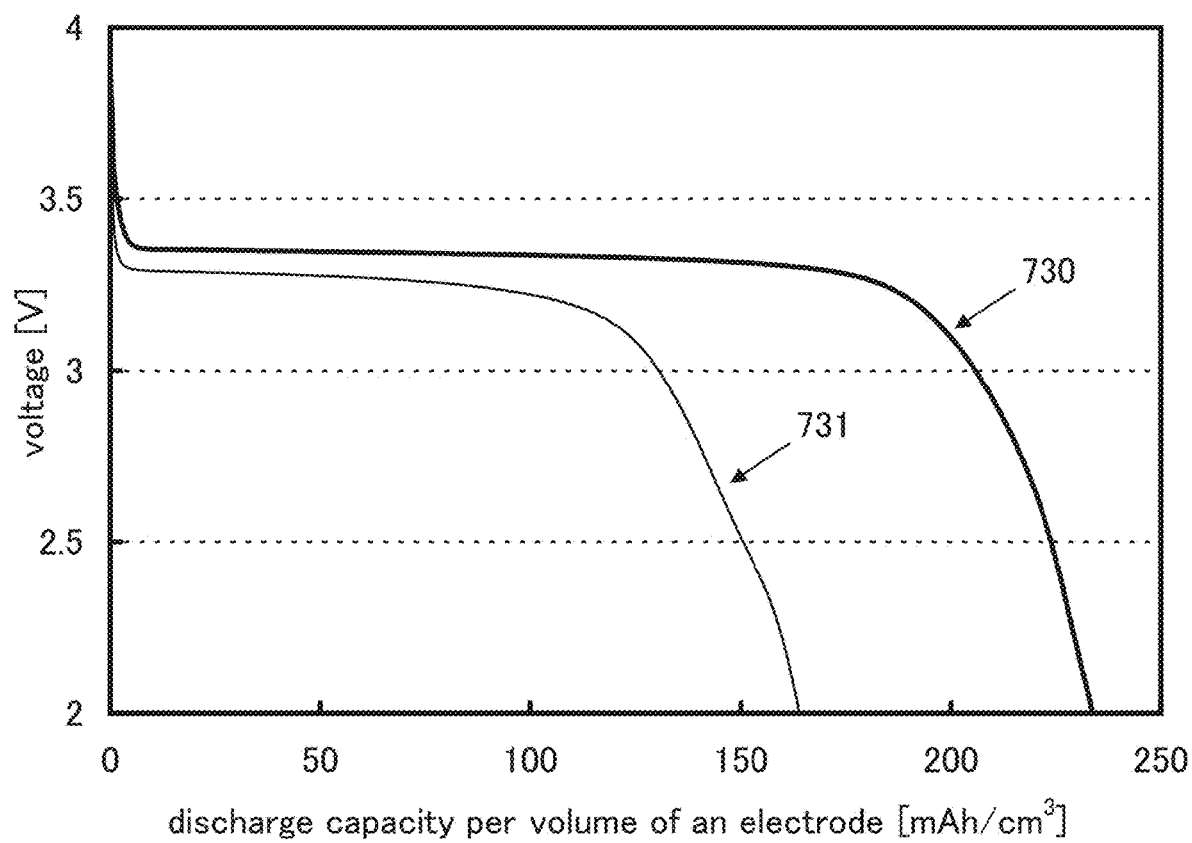
FIG. 11 is a graph showing discharge characteristics.

Next, as reference, FIG. 11 compares discharge characteristics of a cell including a positive electrode using graphene as a conductive additive and discharge characteristics of a cell including a positive electrode using acetylene black (AB), which is conventionally used, as a conductive additive.

In the cell including the positive electrode using graphene as the conductive additive, the positive electrode for a secondary battery including the active material layer in which the compounding ratio of $LiFePO_4$ coated with the carbon layer to graphene oxide and PVDF (excluding the polar solvent) was 94.4:0.6:5.0 (unit: wt %) was used.

On the other hand, in the cell including the positive electrode using the acetylene black (AB) as the conductive additive, $LiFePO_4$ which was not provided with a carbon layer was used as an active material. The compounding ratio of LiFePO$_4$ to AB and PVDF was 85:8:7 (unit: wt %) in an active material layer.

FIG. 11 shows discharge curves of the cells. The horizontal axis represents discharge capacity per volume of an electrode (unit: mAh/cm$^3$) and the vertical axis represents voltage (unit: Volt). A discharge curve 731 of the cell including the positive electrode using the acetylene black as the conductive additive has a narrow plateau region, and the maximum value of the discharge capacity is low. In contrast, a discharge curve 730 of the cell including the positive electrode using graphene as the conductive additive has a wide plateau region, and the maximum value of the discharge capacity is high.

These results show that in the positive electrode for a secondary battery of one embodiment of the present invention, the performance of the active material such as LiFePO$_4$ can be delivered sufficiently, unlike in a conventional positive electrode in which AB is used as a conductive additive.

(Evaluation of Electrode Strength)

Next, the electrode strength of the positive electrode for a secondary battery of one embodiment of the present invention was measured through the above-described winding test.

Three positive electrodes for a secondary battery in which the proportion of graphene oxide were 0.2 wt %, 0.6 wt %, and 1 wt % were fabricated by the above-described method. Electrode strength of each of the three positive electrodes was measured. The winding test was performed in such a manner that the positive electrodes each including an active material layer with a thickness of 70 μm were wound around a cylinder with a diameter of 6 mm, and whether the active material layers were separated was visually checked. Results of the winding test are shown in Table 3. A circle means that the active material layer was not separated from a current collector; a cross means that the active material layer was separated from the current collector.

TABLE 3

| | Proportion of Graphene Oxide | | |
|---|---|---|---|
| | 0.2 wt % | 0.6 wt % | 1 wt % |
| Winding test (φ 6 mm) | ○ | ○ | ○ |

These results of the winding test show that the active material layer was not separated from the current collector when the proportion of graphene oxide was any of 0.2 wt %, 0.6 wt %, and 1 wt %. In addition, it was found that the separation did not occur even when the proportion of a binder was as little as 5 wt %. That is, the positive electrode for a secondary battery had high electrode strength.

Thus, a reduction in the proportion of graphene oxide to 1 wt % or less enables the positive electrode for a secondary battery of one embodiment of the present invention to have enough electrode strength.

As described above, the positive electrode for a secondary battery of one embodiment of the present invention can have high electrode characteristics and maintain electrode strength.

This application is based on Japanese Patent Application serial No. 2012-186404 filed with Japan Patent Office on Aug. 27, 2012, the entire contents of which are hereby incorporated by reference.

What is claimed is:

1. A method for manufacturing a power storage device, comprising:
   forming an active material of which surface is coated with a carbon layer;
   forming a mixture including graphene oxide, the active material, and a binder;
   forming an active material layer by applying the mixture on a surface of a current collector; and
   reducing the graphene oxide in the active material layer after applying,
   wherein the step of reducing is performed by a heat treatment on the active material layer at a temperature in a range of 130° C. or higher and 200° C. or lower.

2. The method according to claim 1, wherein the active material contains lithium.

3. The method according to claim 1,
   wherein the carbon layer has an amorphous structure, and
   wherein a thickness of the carbon layer is in a range of 5 nm or more and 10 nm or less.

4. The method according to claim 1, wherein the surface of the active material is partly coated with the carbon layer.

5. The method according to claim 1, wherein a diameter of the active material is greater than or equal to 50 nm and less than or equal to 500 nm.

6. The method according to claim 1,
   wherein graphene is formed from the graphene oxide by reducing, and
   wherein the graphene contains oxygen at a proportion in a range of 3 atomic% or more and 15 atomic% or less.

7. The method according to claim 1, wherein a maximum value of discharge capacity of the power storage device is 150 mAh/g or more at a discharging rate of 0.2 C.

8. The method according to claim 1, wherein a maximum value of discharge capacity of the power storage device is 140 mAh/g or more at a discharging rate of 1 C.

9. The method according to claim 1, wherein when a discharge rate is increased by 5 times, a decrease amount of a maximum value of discharge capacity of the power storage device is less than 7% of an initial value.

10. The method according to claim 1, wherein a thickness of the current collector is more than or equal to 10 μm and less than or equal to 30 μm.

11. A method for manufacturing a power storage device, comprising:
    forming an active material of which surface is coated with a carbon layer;
    forming a mixture including graphene oxide, the active material, and a binder;
    applying the mixture on a surface of a current collector; and
    reducing the graphene oxide in the mixture after applying,
    wherein the step of reducing is performed by a heat treatment at a temperature in a range of 130° C. or higher and 200° C. or lower.

12. The method according to claim 11, wherein the active material contains lithium.

13. The method according to claim 11,
    wherein the carbon layer has an amorphous structure, and
    wherein a thickness of the carbon layer is in a range of 5 nm or more and 10 nm or less.

14. The method according to claim 11, wherein the surface of the active material is partly coated with the carbon layer.

15. The method according to claim 11, wherein a diameter of the active material is greater than or equal to 50 nm and less than or equal to 500 nm.

16. The method according to claim 11,
wherein graphene is formed from the graphene oxide by reducing, and
wherein the graphene contains oxygen at a proportion in a range of 3 atomic% or more and 15 atomic% or less.

17. The method according to claim 11, wherein a maximum value of discharge capacity of the power storage device is 150 mAh/g or more at a discharging rate of 0.2 C.

18. The method according to claim 11, wherein a maximum value of discharge capacity of the power storage device is 140 mAh/g or more at a discharging rate of 1 C.

19. The method according to claim 11, wherein when a discharge rate is increased by 5 times, a decrease amount of a maximum value of discharge capacity of the power storage device is less than 7% of an initial value.

20. The method according to claim 11, wherein a thickness of the current collector is more than or equal to 10 μm and less than or equal to 30 μm.

21. The method according to claim 1,
wherein a proportion of the graphene oxide in the mixture is in a range of 0.2 wt% or more and 1.0 wt% or less, and
wherein a proportion of the binder in the mixture is in a range of 5 wt% or more and 8 wt% or less.

22. The method according to claim 11,
wherein a proportion of the binder in the mixture is in a range of 5 wt% or more and 8 wt% or less, and
wherein a proportion of the graphene oxide in the mixture is in a range of 0.2 wt% or more and 1.0 wt% or less.

\* \* \* \* \*